(12) United States Patent
Tagome et al.

(10) Patent No.: US 8,508,180 B2
(45) Date of Patent: Aug. 13, 2013

(54) MOTOR DRIVE APPARATUS

(75) Inventors: Masaki Tagome, Osaka (JP); Shun Kazama, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/637,136

(22) PCT Filed: Feb. 2, 2012

(86) PCT No.: PCT/JP2012/000711
§ 371 (c)(1),
(2), (4) Date: Sep. 25, 2012

(87) PCT Pub. No.: WO2012/105266
PCT Pub. Date: Aug. 9, 2012

(65) Prior Publication Data
US 2013/0026968 A1    Jan. 31, 2013

(30) Foreign Application Priority Data
Feb. 3, 2011    (JP) .................................. 2011-021929

(51) Int. Cl.
*H02P 1/46* (2006.01)
(52) U.S. Cl.
USPC ............................ 318/724; 318/700; 318/828
(58) Field of Classification Search
USPC ................ 318/724, 700, 828, 139, 432, 732; 363/56.01
See application file for complete search history.

(56) References Cited

U.S. PATENT DOCUMENTS
2011/0193532 A1 *   8/2011   Iwanaga et al. ............... 320/163

FOREIGN PATENT DOCUMENTS

| JP | 48-17557 | 5/1973 |
|----|----------|--------|
| JP | 5-316755 | 11/1993 |
| JP | 10-225181 | 8/1998 |
| JP | 2000-4504 | 1/2000 |
| JP | 2000-116149 | 4/2000 |
| JP | 2003-18886 | 1/2003 |
| JP | 2003-333862 | 11/2003 |
| JP | 2005-229669 | 8/2005 |
| JP | 2006-129668 | 5/2006 |
| JP | 2009-50042 | 3/2009 |
| JP | 2009-278827 | 11/2009 |

OTHER PUBLICATIONS

International Search Report issued Apr. 24, 2012 in International (PCT) Application No. PCT/JP2012/000711.
Written Opinion of the International Searching Authority issued Apr. 24, 2012 in International (PCT) Application No. PCT/JP2012/000711.

* cited by examiner

*Primary Examiner* — Karen Masih
(74) *Attorney, Agent, or Firm* — Wenderoth, Lind & Ponack, L.L.P.

(57) ABSTRACT

A motor drive apparatus receiving power from a power source and driving a motor with independent polyphase systems of excitation coils, comprises: a control circuit and power converters each corresponding to one system, each including an inverter circuit, an interrupter circuit, and a temperature detector, the inverter circuits being connected in series to the power source and, while not short-circuited, supplying power to the excitation coil, wherein the control circuit detects an operating state of the motor, short-circuits the inverter circuits and interrupts the interrupter circuits for a subset of power converters defined according to the operating state, such that a source voltage is supplied to non-short-circuited inverter circuits, and, when a power converter exceeds a predetermined temperature, the control circuit short-circuits the inverter circuit and interrupts the interrupter circuit thereof, and, in another power converter not exceeding the predetermined temperature, operates the inverter circuit and connects the interrupter circuit.

10 Claims, 23 Drawing Sheets

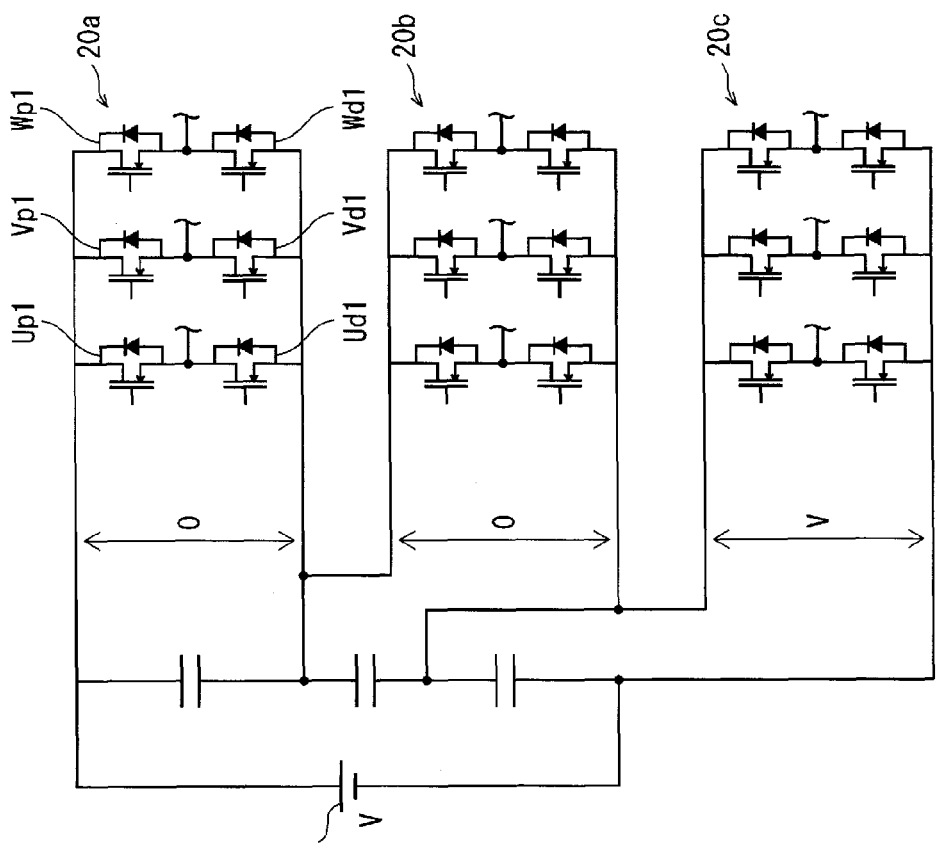
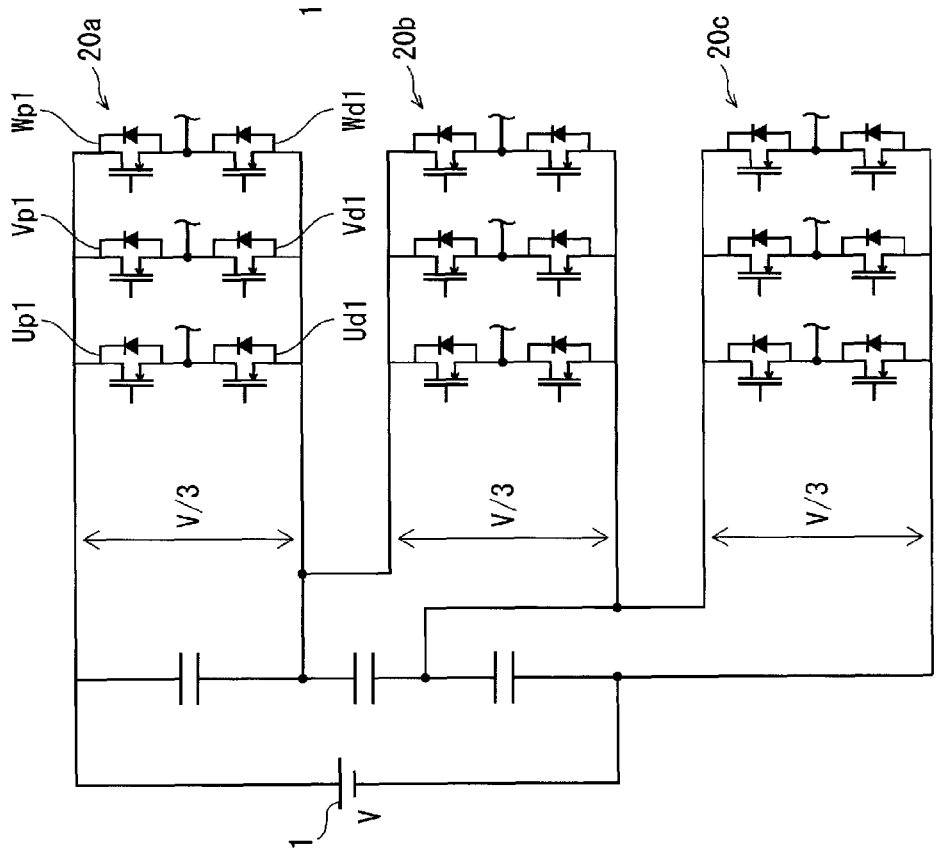

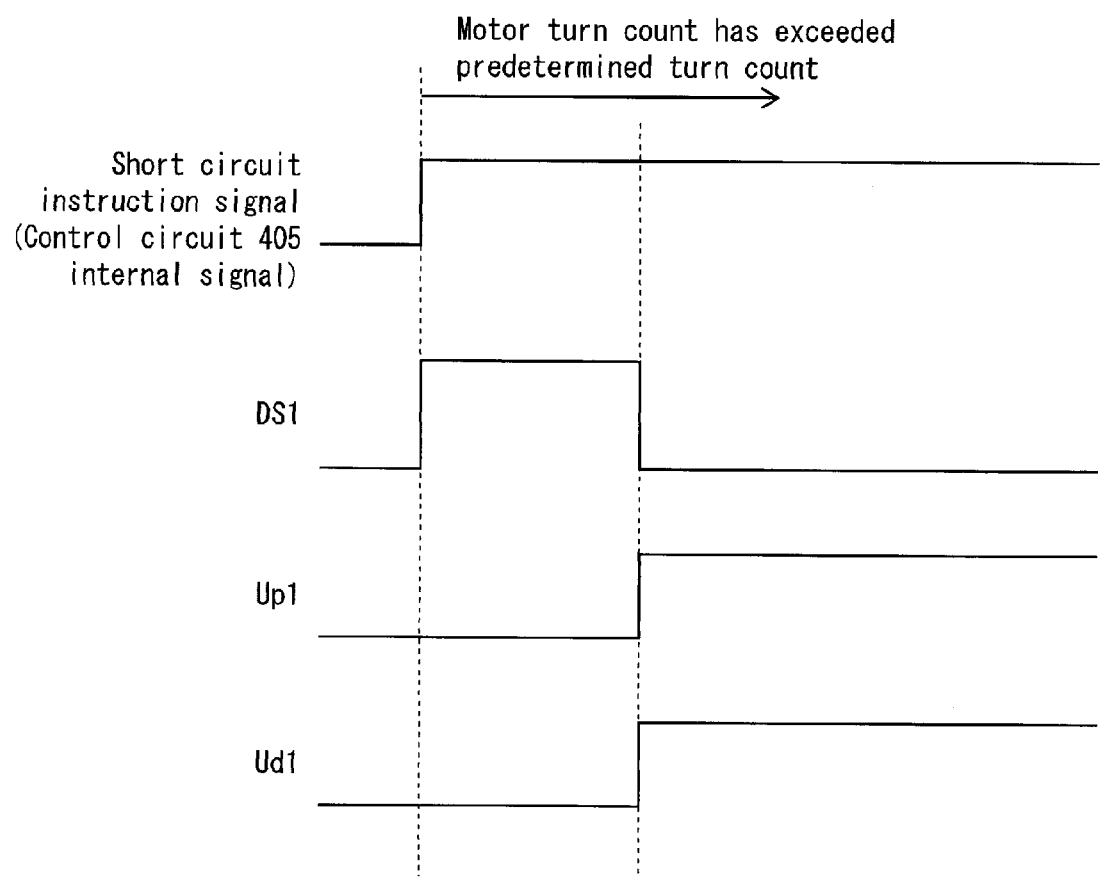

MOTOR DRIVE APPARATUS

TECHNICAL FIELD

The present disclosure pertains to a motor drive apparatus, particularly to controlling the supply of drive power to a motor by using a plurality of inverters.

BACKGROUND ART

In recent years, progress has been made in the field of high-voltage motor drive apparatus with the intent of increasing the output of three-phase synchronous motors (hereinafter, motors). Consequently, the problem of inverter loss has greatly spread. Phase inversion is desired in order to increase output and voltage. To this end, Patent Literature 1 discloses technology for decreasing inversion loss while increasing efficiency and realizing a high-output motor. The motor drive apparatus of Patent Literature 1 performs switching according to a motor turn count, so as to use one of inverter circuits provided as a series-connected pair and inverter circuits provided as a parallel-connected pair. Specifically, the series-connected inverter circuits are used when the motor turn count is less than a predetermined turn count, and the parallel-connected inverter circuits are used when the motor turn count exceeds the predetermined turn count.

The pair of series-connected inverter circuits split a source voltage such that each inverter circuit generates split voltage (½ of the source voltage) and supplies the split voltage to drive the motor. Accordingly, switching loss in switching elements making up the inverter circuits is decreased. In contrast, the parallel-connected pair of inverter circuits each generate power without splitting the source voltage to supply power to the motor. Accordingly, the motor is continually made to rotate despite high back-voltage occurring in motor coils when the motor turn count grows large.

According to the above, Cited Publication 1 continually causes the motor to rotate by having the inverter circuits drive the motor with high voltage when the motor has equaled or exceeded a predetermined turn count, yet decreases switching loss and achieves high efficiency and output while the turn count is low, which is the normal operating state of the motor.

CITATION LIST

Patent Literature

[Patent Literature 1]
Japanese Patent Application Publication No. 2005-229669

SUMMARY OF INVENTION

Technical Problem

However, a problem arises in that complicated circuitry is used in conventional technology to switch the two inverter circuits between serial and parallel connection. That is, attempts to expand the circuitry of conventional technology so as to switch three or more inverter circuits between serial and parallel connection in order to more finely control the power source voltage is likely to fail, given difficulties in changing such circuitry. Further, the circuitry indicated in the conventional technology involves circuits being substantially inactive while connected in series or connected in parallel. In other words, the configuration involves redundancy. Such redundancy increases with growing numbers of inverter circuits splitting the power supply voltage.

Further still, many switching elements are added to the circuits in order to enable switching between the parallel connection and the series connection. As such, the inverter loss due to the switching elements increases, and cost increases are more likely.

In consideration of the above problems, the present disclosure aims to provide a motor drive apparatus that realizes high efficiency and output while providing a simpler configuration than conventional technology.

Solution To Problem

The motor drive apparatus of the present disclosure, receiving electric power supplied from a DC power source and driving a motor that is provided with a plurality of independent polyphase systems of excitation coils, comprises: a control circuit and a plurality of power converters each corresponding to one of the systems, wherein each of the power converters includes an inverter circuit, an interrupter circuit connected between the inverter circuit and an excitation coil of a phase of the system, and a temperature detector, the inverter circuits are connected in series to the DC power source and, while not in a short-circuit mode, each inverter circuit supplies electric power to the excitation coil of a corresponding phase, and the control circuit detects an operating state of the motor, and switches the inverter circuits to the short-circuit mode and the interrupter circuits to an interruption mode, the inverter circuits and the interrupter circuits pertaining to a subset of the power converters defined according to the operating state of the motor, such that the control circuit causes a source voltage from the DC power source to be supplied to the inverter circuits that are not in the short-circuit mode, and, when a temperature detected for a given power converter by the temperature detector exceeds a predetermined temperature, the control circuit switches the inverter circuit of the given power converter to the short-circuit mode and switches the interrupter circuit of the given power converter to the interruption mode, and, in another power converter for which the temperature detected by the temperature detector does not exceed the predetermined temperature, switches the inverter circuit to an operation mode and switches the interrupter circuit to a connection mode.

Advantageous Effects of Invention

According to the motor drive apparatus of the present disclosure, a simpler configuration than conventional technology that involves inverter circuits connected in series is able to supply power to a motor by having the inverter circuits split source power voltage in accordance with an operating state of the motor. Also, when the temperature detected by a power converter exceeds a predetermined temperature, switching is performed such that a different power converter is used. Thus, the useful life of the power converter is increased and improvements are made to the reliability of the motor drive apparatus.

BRIEF DESCRIPTION OF DRAWINGS

FIG. 8A illustrates a situation where DC power source voltage is split into three parts by the three-phase inverter circuit, and FIG. 8B illustrates a situation where the DC power source voltage is not split by the three-phase inverter circuit.

FIG. 23 is a timing chart pertaining to the execution of short-circuiting for the three-phase inverter circuits.

DESCRIPTION OF EMBODIMENTS

Figure 1:
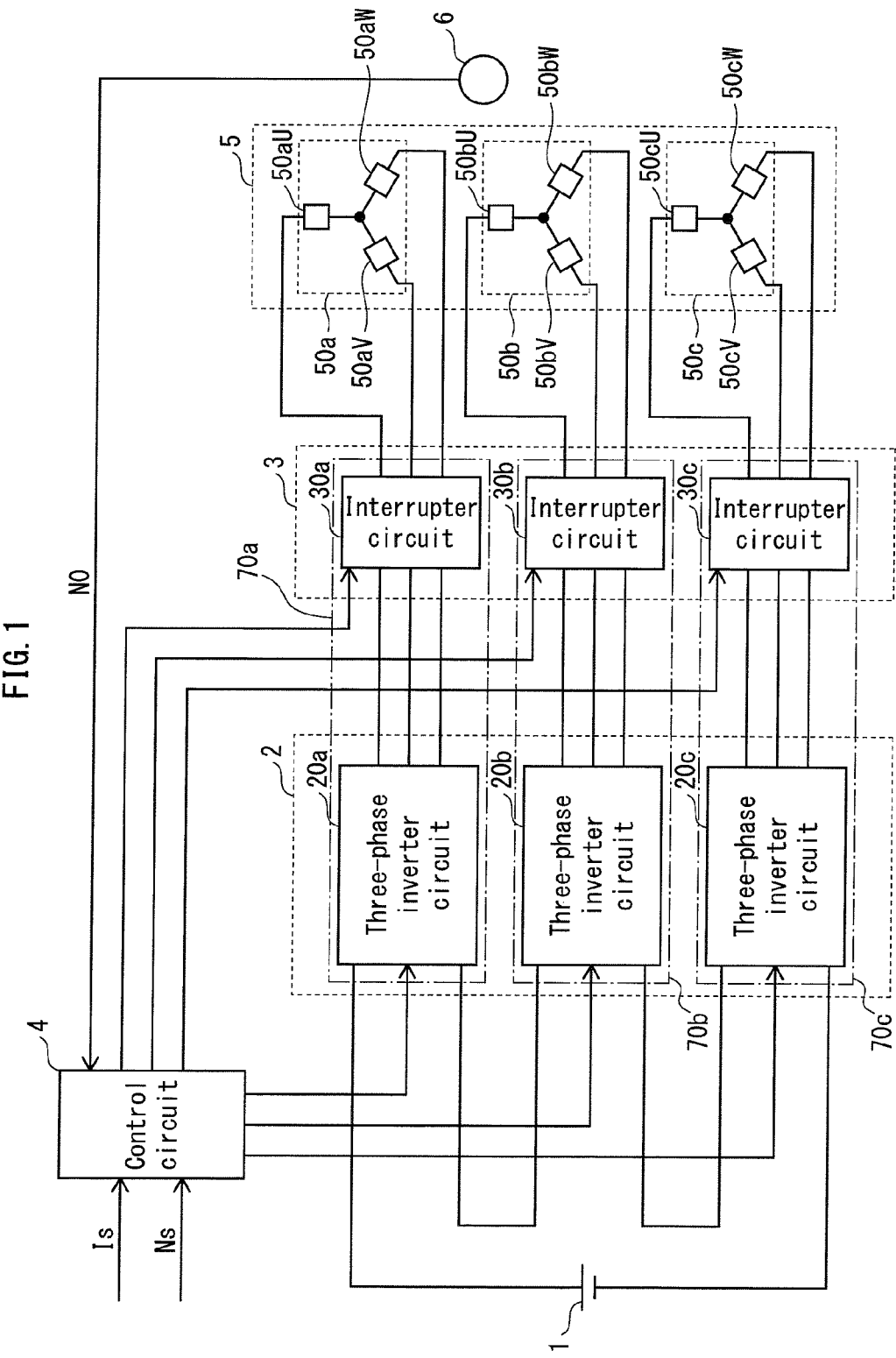
FIG. 1 illustrates the overall configuration of a motor drive apparatus pertaining to Embodiment 1.

The motor drive apparatus of the present disclosure, receiving electric power supplied from a DC power source and driving a motor that is provided with a plurality of independent polyphase systems of excitation coils, comprises: a control circuit and a plurality of power converters each corresponding to one of the systems, wherein each of the power converters includes an inverter circuit, an interrupter circuit connected between the inverter circuit and an excitation coil of a phase of the system, and a temperature detector, the inverter circuits are connected in series to the DC power source and, while not in a short-circuit mode, each inverter circuit supplies electric power to the excitation coil of a corresponding phase, and the control circuit detects an operating state of the motor, and switches the inverter circuits to the short-circuit mode and the interrupter circuits to an interruption mode, the inverter circuits and the interrupter circuits pertaining to a subset of the power converters defined according to the operating state of the motor, such that the control circuit causes a source voltage from the DC power source to be supplied to the inverter circuits that are not in the short-circuit mode, and, when a temperature detected for a given power converter by the temperature detector exceeds a predetermined temperature, the control circuit switches the inverter circuit of the given power converter to the short-circuit mode and switches the interrupter circuit of the given power converter to the interruption mode, and, in another power converter for which the temperature detected by the temperature detector does not exceed the predetermined temperature, switches the inverter circuit to an operation mode and switches the interrupter circuit to a connection mode.

According to this configuration, a simpler configuration than conventional technology and that involves inverter circuits connected in series is able to supply power to a motor by having the inverter circuits split source power voltage in accordance with an operating state of the motor. Higher efficiency and output are realized for the motor by switching between supplying power that maintains the rotation of the motor and power that reduces switching loss, in accordance with the operating state of the motor. When the temperature detected by a power converter exceeds a predetermined temperature, switching is performed such that a different power converter is used. Thus, the useful life of the power converter is increased and improvements are made to the reliability of the motor drive apparatus.

Also, each of the inverter circuits comprises a plurality of switching elements in a bridge connection, and the temperature detector pertaining to each of the power converters measures a temperature for each of the switching elements.

According to this configuration, the useful life of the power converter, i.e., of the switching element, is extended, and improvements are made to the reliability of the motor drive apparatus.

Further, each of the inverter circuits includes a smoothing capacitor, and the temperature detector pertaining to each of the power converters measures a temperature for the smoothing capacitor.

Generally speaking, the smoothing capacitor is more prone to high temperatures when PWM control is being executed, in contrast to situations where the three-phase inverter circuit is in the short-circuit mode (hereinafter also termed short-circuiting). According to this configuration, the useful life of the power converter, i.e., of the smoothing capacitor, is extended, and improvements are made to the reliability of the motor drive apparatus.

Further still, each of the interrupter circuits includes a plurality of switching elements, and the temperature detector pertaining to each of the power converters measures a temperature for each of the switching elements.

According to this configuration, the useful life of the power converter, i.e., of the switching elements of the interrupter circuits, is extended, and improvements are made to the reliability of the motor drive apparatus.

In addition, each of the inverter circuits is a three-phase inverter circuit, the excitation coils comprise star-connected coils in three phases, the temperature detector pertaining to each of the power converters detects a temperature for circuits corresponding to each phase, and when switching the inverter circuits in the power converters to the short-circuit mode, the control circuit switches the circuits corresponding to at least one phase for which the temperature detected by the temperature detector does not exceed the predetermined temperature.

Accordingly, short-circuits caused by abnormal conditions due to exceeding a predetermined temperature on a given path are avoided, while short-circuiting is reliably made to occur on normally-operating paths.

Alternatively, each of the inverter circuits is a three-phase inverter circuit comprising a plurality of switching elements in a bridge connection, the excitation coils comprise star-connected coils in three phases, and when switching one of the three-phase inverter circuits to the short-circuit mode, the control circuit switches series-connected switching elements corresponding to at least one of the three phases to a conducting mode.

According to this configuration, the circuit in one phase is short-circuited, thus reducing the ON resistance and decreasing loss in the apparatus. Also, the useful life of circuits not short-circuited is extended. As such, a balance between loss reduction and useful life extension is achievable by setting appropriate values for the phase to be short-circuited in accordance with circuit specifications.

As another alternative, a specific inverter circuit among the plurality of inverter circuits is never switched to the short-circuit mode by the control circuit, and a switching element in one of the inverter circuits other than the specific inverter circuit has a lower impedance than a switching element in the specific inverter circuit.

According to this configuration, the three-phase inverter circuit to which split voltage is not supplied is configured using switching elements having comparatively lower impedance, relative to the switching elements used for a three-phase inverter circuit that is normally and constantly in the operation mode and is more likely to have unsplit voltage supplied thereto have comparatively low impedance. Thus, inversion loss is decreased in comparison to configurations where all elements have high impedance.

As a further alternative, a specific inverter circuit among the plurality of inverter circuits is never switched to the short-circuit mode by the control circuit, and a switching element in one among the number of inverter circuits in the short-circuit mode has a smaller maximum current capacity than a switching element in the specific inverter circuit.

According to this configuration, an inverter circuit having switching elements with a greater maximum current capacity operates when the motor rotates at high speed. Thus, reliable driving is achievable while suppressing heating. Conversely, an inverter circuit having switching elements with a smaller maximum current capacity operates when the motor rotates at low speed. Thus, switching loss is reduced in comparison to configurations using inverter circuits where all switching elements have a high maximum current capacity. Accordingly, improvements are achieved in the efficiency and reliability of the motor drive apparatus.

As yet another alternative, each of the interrupter circuits comprises a switching element and a voltage detector measuring an ON voltage of the switching element, and the control circuit uses the ON voltage to detect a current running through the switching element.

According to this configuration, current values are obtainable without using a current sensor, which is expensive and susceptible to malfunctions during high-temperature operation. Thus, improvements are made to the motor drive apparatus in terms of reliability and cost efficacy.

As yet a further alternative, each of the inverter circuits is a three-phase inverter circuit, and comprises a bridge circuit including plurality of switching elements in a bridge connection, a smoothing capacitor, and a discharge circuit including a discharging resistor and a discharge switching element, connected in series, the bridge circuit, the smoothing capacitor, and the discharge circuit are connected in parallel, and before switching the switching elements in the bridge connection to the short-circuit mode so as to switch the inverter circuits to the short-circuit mode, the control circuit discharges an accumulated charge on the smoothing capacitor by switching the discharging switching element to an ON state for a predetermined interval.

According to this configuration, excessive current flow from the smoothing capacitor is constrained while the three-phase inverter circuit is in the short-circuit mode. Thus, improvements are made to the motor drive apparatus in terms of reliability.

Embodiments of the motor drive apparatus pertaining to the present invention are described below, with reference to the accompanying drawings.

1. Embodiment 1

(Configuration)

FIG. 1 illustrates the overall configuration of a motor drive apparatus pertaining to Embodiment 1.

The motor drive apparatus includes an inverter circuit group 2, an interrupter circuit group 3, a control circuit 4, and a position detector 6, and is connected to a DC power source 1 and to a motor 5.

The DC power source 1 supplies DC power to the inverter circuit group 2.

The inverter circuit group 2 includes three-phase inverter circuits 20a, 20b, and 20c. Three-phase inverter circuit 20a is a three-phase bridge inverter circuit providing a bridge between six switching elements.

Figure 2:
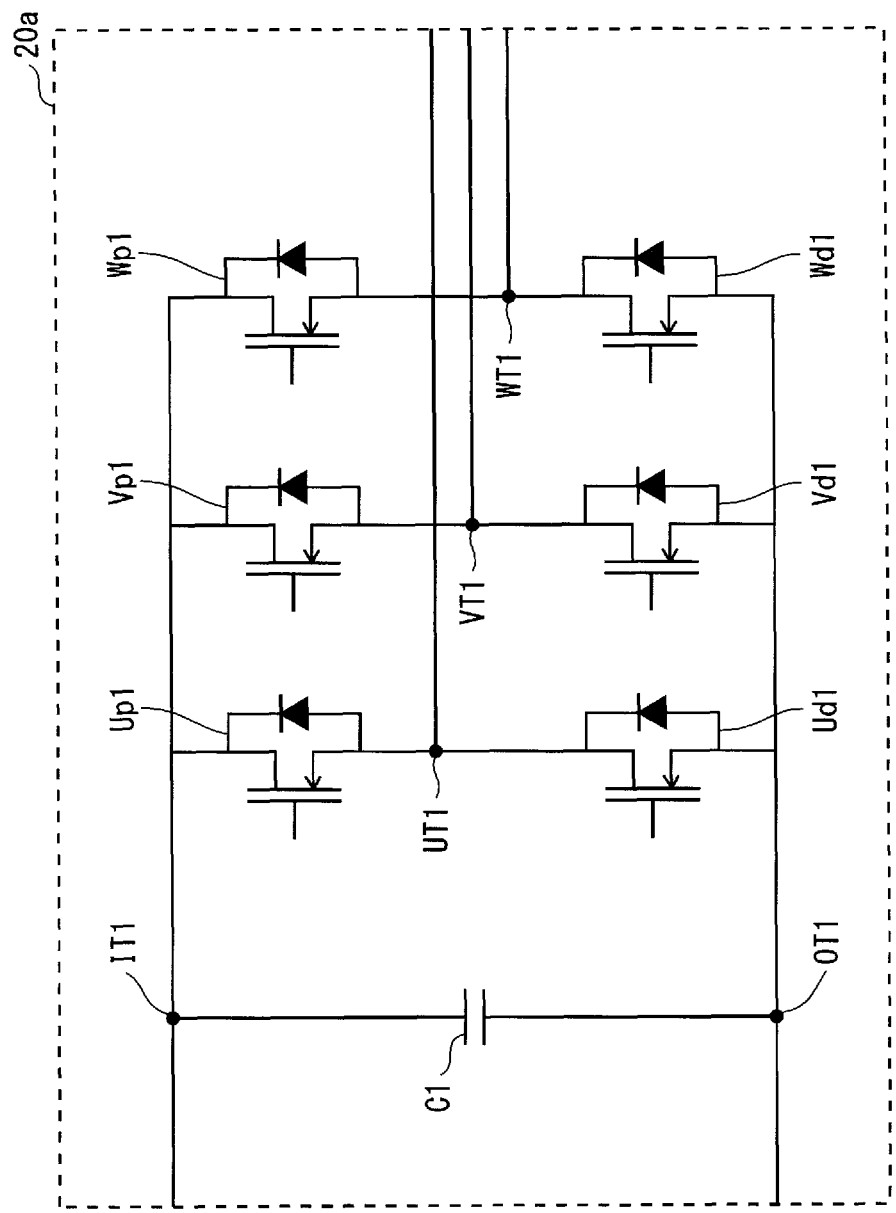
FIG. 2 is a circuit diagram illustrating the details of a three-phase inverter circuit.

FIG. 2 is a circuit diagram illustrating the details of three-phase inverter circuit 20a.

As shown in FIG. 2, three-phase inverter circuit 20a includes switching elements Up1 and Ud1, Vp1 and Vd1, and Wp1 and Wd1, respectively connected in series. These serially-connected switching elements are connected in parallel to a smoothing capacitor C1. The smoothing capacitor C1 smoothes the power source voltage supplied by the DC power source 1 and eliminates noise superimposed thereon. Junction UT1 between elements Up1 and Ud1, junction VT1 between elements Vp1 and Vd1, and junction WT1 between elements Wp1 and Wd1 are respectively connected to a U-phase coil 50aU, a V-phase coil 50aV, and a W-phase coil 50aW via switches SU1, SV1, and SW1 in later-described interrupter circuit 30a, which is included in the interrupter circuit group 3.

The three-phase inverter circuits 20a, 20b, and 20c have two modes, namely an operation mode of receiving power from the DC power source and supplying three-phase AC power, and a short-circuit mode of being short-circuited. The three-phase inverter circuits 20a, 20b, and 20c switch between the operation mode and the short-circuit mode as controlled by the control circuit 4. The short-circuit mode is a mode in which switching element Up1 of three-phase inverter circuit 20a and a switching element connected in series thereto, such as Ud1, are both ON. In the present Embodiment, switching elements Up1, Ud1, Vp1, Vd1, Wp1, and Wd1 are switched ON (i.e., to conduction mode) upon input of a high-level signal, and are switched OFF (i.e., to interruption mode) upon input of a low-level signal. The other three-phase inverter circuits 20b and 20c are configured identically to three-phase inverter circuit 20a. Descriptions of three-phase inverter circuits 20b and 20c are thus omitted.

The three-phase inverter circuits 20a, 20b, and 20c and the DC power source 1 thus form a series circuit. Specifically, three-phase inverter circuit 20a has a contact point IT1 connected to a cathode terminal of the DC power source 1, and another contact point OT1 connected to three-phase inverter circuit 20b. Contact point OT1 of three-phase inverter circuit 20b is connected to contact point IT1 of three-phase inverter circuit 20c. Likewise, contact point OT1 of three-phase inverter circuit 20c is connected to an anode terminal of the DC power source 1.

The interrupter circuit group 3 includes interrupter circuits 30a, 30b, and 30c.

Figure 3:
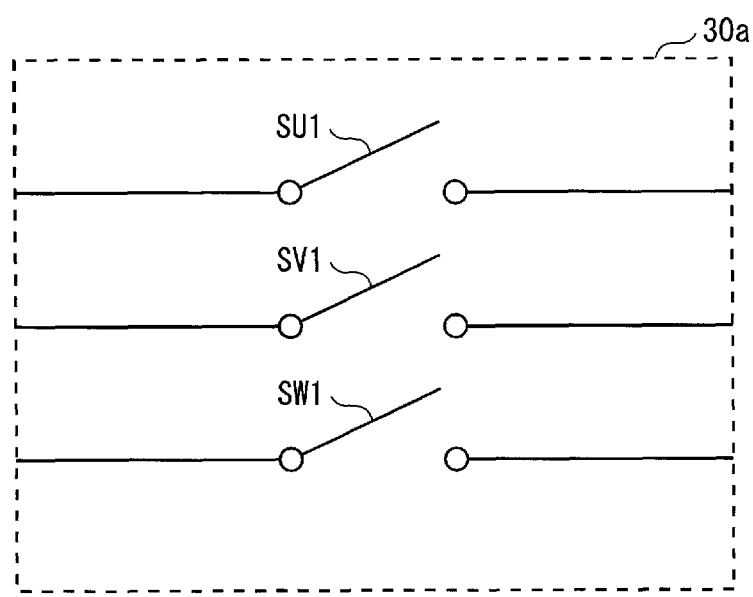
FIG. 3 is a circuit diagram illustrating the configuration of an interrupter circuit.

FIG. 3 is a circuit diagram illustrating the configuration of interrupter circuit 30a.

Interrupter circuit 30a includes switches SU1, SV1, and SW1. Switch SU1 has one end connected to junction UT1, and another end connected to a U-phase coil 50aU of coil 50a. Switch SU1 is switched ON and OFF in accordance with connection instructions and interruption instructions from the control circuit 4, thereby electrically connecting and disconnecting junction UT1 and coil 50aU. Switch SV1 has one end connected to junction VT1, and another end connected to a V-phase coil 50aV of coil 50a. Switch SV1 is switched ON and OFF in accordance with connection instructions and interruption instructions from the control circuit 4, thereby electrically connecting and disconnecting junction VT1 and coil 50aV. Switch SW1 has one end connected to junction WT1, and another end connected to a V-phase coil 50aV of coil 50a. Switch SW1 is switched ON and OFF in accordance with connection instructions and interruption instructions from the control circuit 4, thereby electrically connecting and disconnecting junction WT1 and coil 50aW. In the present Embodiment, the connection instruction is the input of a high-level signal, and the interruption instruction is the input of a low-level signal.

The motor 5 is configured to include an independent polyphase system of excitation coils (coils 50a, 50b, and 50c). Coil 50a is a star-connected system made up of the U-phase coil 50aU, the V-phase coil 50aV, and the W-phase coil 50aW. The coils 50aU, 50aV, and 50aW each have one end connected to a common central point. The other end of coil 50aU is connected to switch SU1, the other end of coil 50aV is connected to switch SV1, and the other end of coil 50aW is connected to switch SW1. Coils 50b and 50c are configured identically to coil 50a. Explanations thereof are thus omitted.

The above-described system is hereinafter termed system a with reference to coil 50a, system b with reference to coil 50b, and system c with reference to coil 50c. Each of the systems includes a power converter made up of a three-phase inverter and an interrupter circuit. Specifically, system a includes power converter 70a made up of three-phase inverter circuit 20a and interrupter circuit 30a, system b includes power converter 70b made up of three-phase inverter circuit 20b and interrupter circuit 30b, and system c includes power converter 70c made up of three-phase inverter circuit 20c and interrupter circuit 30c.

The position detector 6 detects a turn count NO, which is an example of an operating state of the motor 5, and notifies the control circuit 4 of the turn count NO so detected as motor turn count information.

The control circuit 4 receives motor drive instruction signals Is and Ns. The Is signal indicates whether the motor is to perform normal rotation or reverse rotation, or to stop. The Ns signal indicates a target turn count for the motor. When the Is signal indicates normal or reverse rotation, the control circuit 4 performs drive control such that the motor rotates in the direction indicated by the Is signal until the turn count indicated by the Ns signal is reached. However, when the Is signal indicates stopping, the control circuit 4 stops the rotation of the motor. The control circuit 4 is notified of the turn count NO by the position detector 6. In accordance with the turn count NO, the control circuit 4 switches the three-phase inverter circuits 20a, 20b, and 20c between the operation mode and the short-circuit mode, and switches the interrupter circuits 30a, 30b, and 30c between the conduction mode and the interruption mode.

Although the control circuit 4 and the position detector 6 are configured separately, the control circuit 4 may also incorporate the functions of the position detector 6.

(Operations)

The following describes the operations of the motor drive apparatus pertaining to the present Embodiment, with a primary focus on the control circuit 4 and with reference to FIGS. 4-6 and 8.

Figure 4:
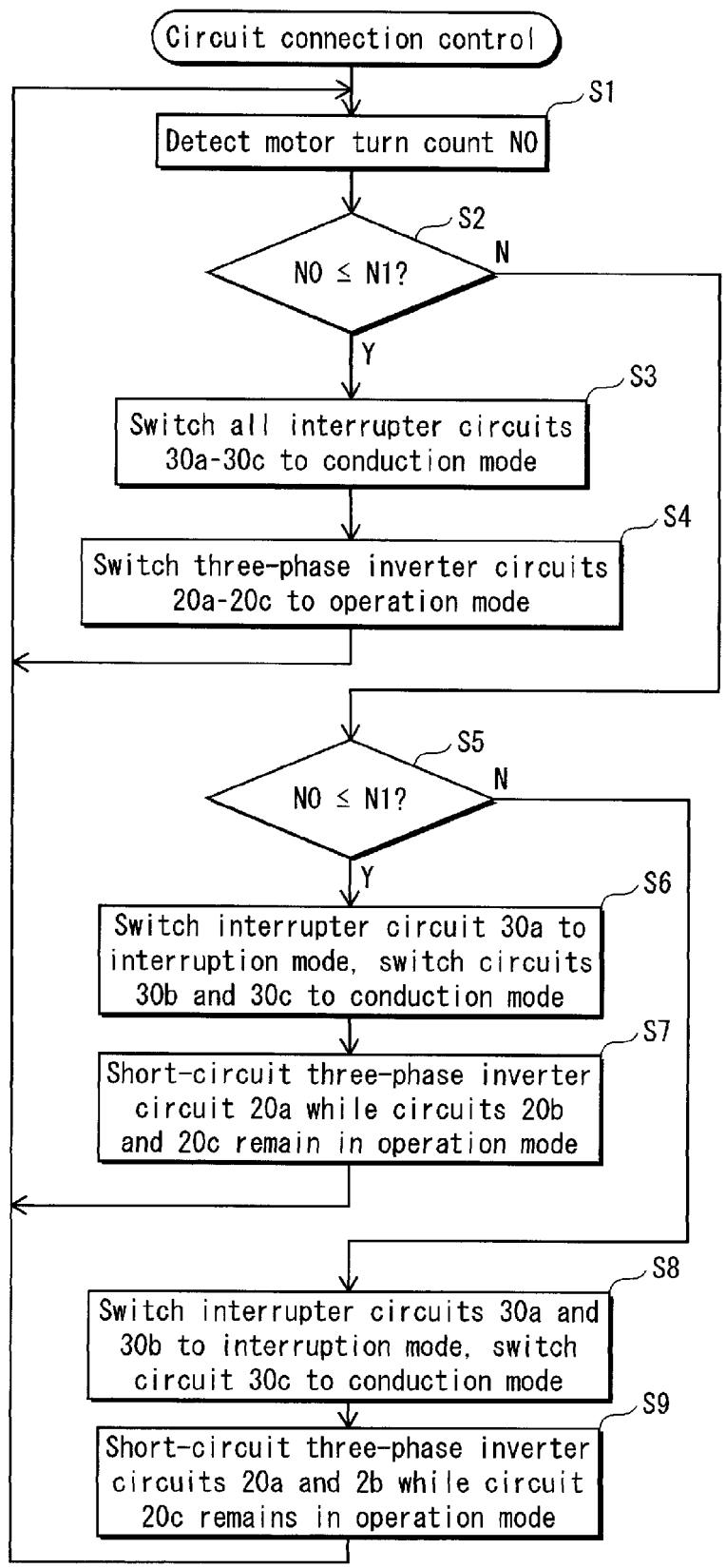
FIG. 4 is a flowchart describing a circuit connection control process.

FIG. 4 is a flowchart describing circuit connection control.

Figure 5:
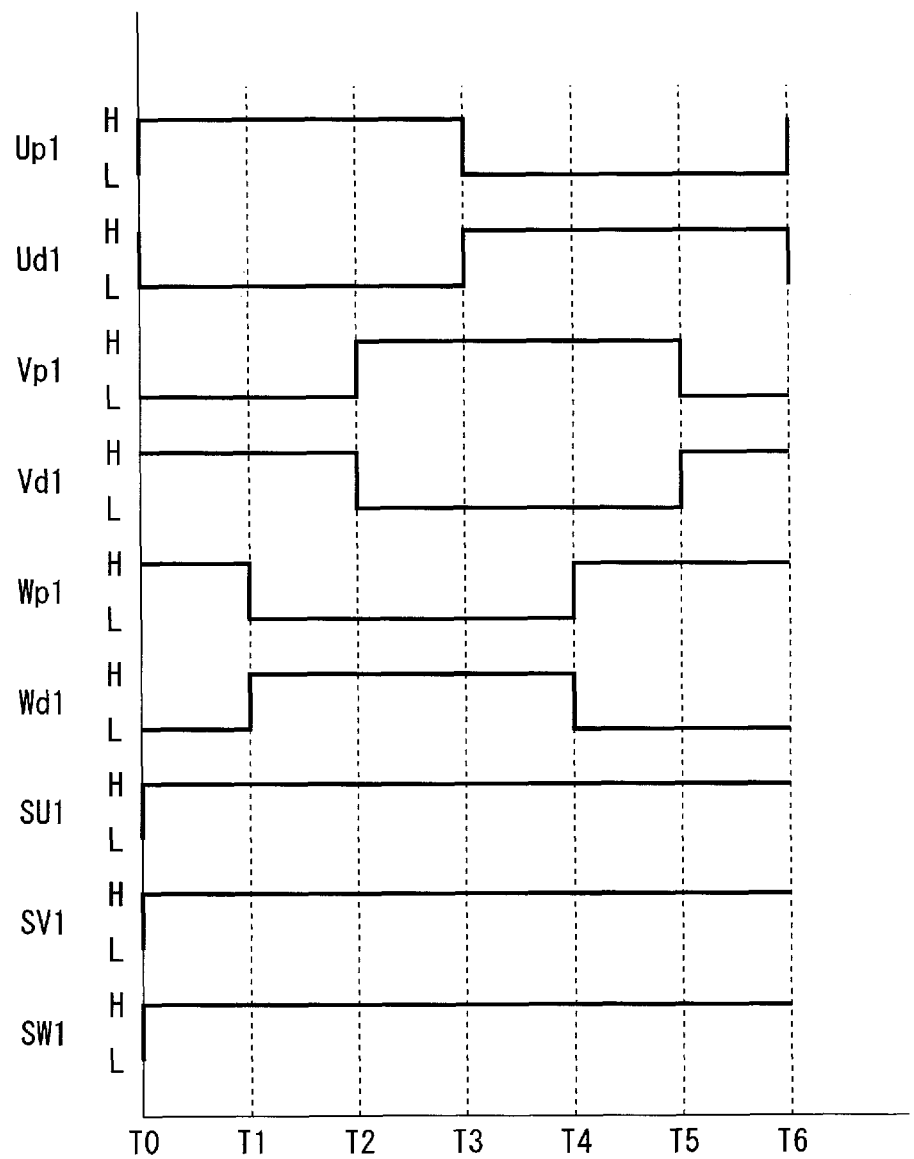
FIG. 5 is a timing chart pertaining to a control signal used to switch the three-phase inverter circuit to a conduction mode.

FIG. 5 is a timing chart pertaining to the control signal used to switch three-phase inverter circuit 20a to the conduction mode.

Figure 6:
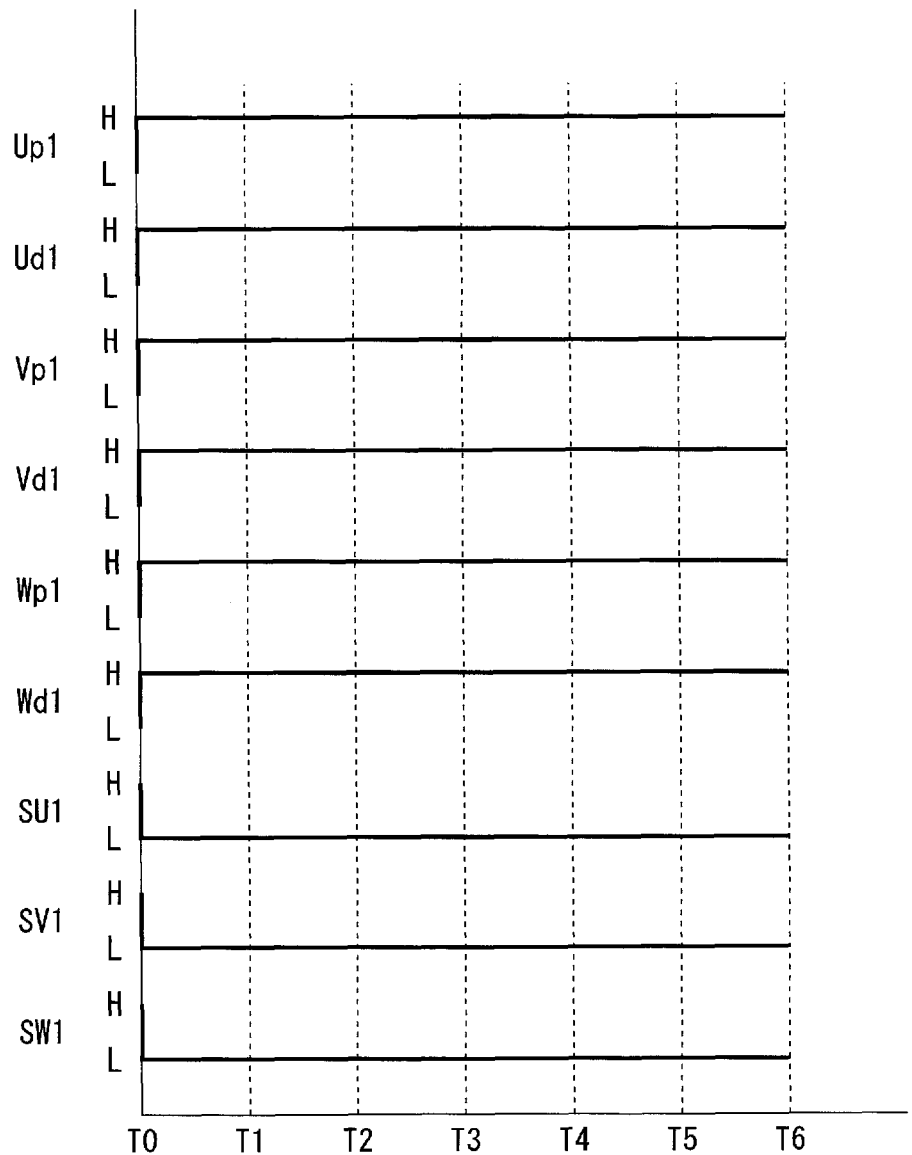
FIG. 6 is a timing chart pertaining to a control signal used to switch the three-phase inverter circuit to a short-circuit mode.

FIG. 6 is a timing chart pertaining to the control signal used to switch three-phase inverter circuit 20a to the short-circuit mode.

FIG. 8A illustrates a situation where the DC power source voltage is split into three parts by the three-phase inverter circuit, and FIG. 8B illustrates a situation where the DC power source voltage is not split by the three-phase inverter circuit.

In FIGS. 5 and 6, the labels Up1, Ud1, Vp1, Vd1, Wp1, and Wd1 respectively correspond to signals for controlling the switching elements Up1, Ud1, Vp1, Vd1, Wp1, and Wd1 in three-phase inverter circuit 20a. Further, the labels SU1, SV1, and SW1 respectively correspond to signals for controlling the switches SU1, SV1, and SW1 in the interrupter circuit 30a shown in FIG. 3. The labels H and L represent high-level and low-level signals. A switching element or switch is switched ON (to the conduction mode) by a high-level signal, and is switched OFF (to the interruption mode) by a low-level signal. In FIGS. 5 and 6, the labels T0 through T6 each represent an electrical angle of $2\pi$. In FIG. 5, the switching elements Up1, Ud1, Vp1, Vd1, Wp1, and Wd1 are controlled such that three-phase inverter circuits normally operate to convert the DC power source into an AC power source. The mode in which such control is performed is the aforementioned operation mode for the three-phase inverter circuits. Specifically, the switching elements Up1, Ud1, Vp1, Vd1, Wp1, and Wd1 are each intermittently switched ON for a duration of $\pi$. When inverted voltage is applied to switching elements Up1 and Ud1, such that Up1 is at high level and Ud1 is at low level, a period (generally termed dead time) is provided during which each pair of switching elements Up1 and Ud1, Vp1 and Vd1, and Wp1 and Wd1 is simultaneously switched OFF so as to prevent short-circuiting. The same applies when inverted voltage is applied to switching elements Vp1 and Vd1 or to switching elements Wp1 and Wd1. Furthermore, switching elements Up1, Vp1, and Wp1 are controlled so as to be switched ON and OFF with a mutual offset of $2\pi/3$. In FIG. 5, switches SU1, SV1, and SW1 are all at high level. Thus, the switches SU1, SV1, and SW1 are all ON (i.e., in the conduction mode). This control is the aforementioned conduction mode for interrupter circuit 30a.

In FIG. 6, all of the switching elements Up1, Ud1, Vp1, Vd1, Wp1, and Wd1 are at high level, thus all switching elements are ON (i.e., in the conduction mode). The mode in which such control is performed is the aforementioned short-circuit mode for the three-phase inverter circuits. Also, in FIG. 6, the switches SU1, SV1, and SW1 are all at low level. Thus, the switches SU1, SV1, and SW1 are all OFF (i.e., in the interruption mode). This control is the aforementioned interruption mode for interrupter circuit 30a.

The following description is based on the flowchart of FIG. 4.

First, the position detector 6 detects turn count NO for the motor 5, and notifies the control circuit 4 of the turn count NO so detected (S1). The detection of turn count NO may be performed constantly, or at predetermined intervals. The control circuit 4 compares turn count NO from the notification to predetermined turn count N1 (S2). When turn count NO is lower than or equal to predetermined turn count N1 (Y in S2), the control circuit 4 performs control such that the interrupter circuits 30a, 30b, and 30c are all in the conduction mode (S3). Specifically, the respective switches SU1, SV1, and SW1 of the interrupter circuits 30a, 30b, and 30c are controlled in accordance with the timing chart given in FIG. 5. The control circuit 4 then performs control such that the three-phase inverter circuits 20a, 20b, and 20c are all in the operation mode (S4). Specifically, the respective switching elements Up1, Ud1, Vp1, Vd1, Wp1, and Wd1 of the three-phase inverter circuits 20a, 20b, and 20c are controlled in accordance with the timing chart given in FIG. 5. The controls performed in steps S3 and S4 cause the DC voltage supplied by the DC power source 1 to be split into three parts by the three-phase inverter circuits 20a, 20b, and 20c. As shown in FIG. 8A, a three-phase AC power waveform is generated from the DC power source voltage so split in three by the three-phase inverter circuits 20a, 20b, and 20c.

Alternatively, when turn count NO exceeds predetermined turn count N1 (N in S2), and is equal to or less than predetermined turn count N2 (Y in S5), the control circuit 4 performs control such that interrupter circuit 30a is switched to the interruption mode while the other interrupter circuits 30b and 30c remain in the conduction mode (S6). Specifically, interrupter circuit 30a is controlled in accordance with the timing chart given by FIG. 6, while the other interrupter circuits 30b and 30c are controlled in accordance with the timing chart given by FIG. 5. The control circuit 4 performs further control such that three-phase inverter circuit 20a is switched to the short-circuit mode while the other three-phase inverter circuits 20b and 20c remain in the operation mode (S7). Specifically, three-phase inverter circuit 20a is controlled in accordance with the timing chart given by FIG. 6, while the other three-phase inverter circuits 20b and 20c are controlled in accordance with the timing chart given by FIG. 5. The controls performed in steps S6 and S7 cause the DC voltage supplied by the DC power source 1 to be applied to three-phase inverter circuits 20b and 20c via three-phase inverter circuit 20a, which is in the short-circuit mode. That is, the DC voltage supplied by the DC power source 1 goes from being split into three parts by the three-phase inverter circuits 20a, 20b, and 20c, to being split into two parts by three-phase inverter circuits 20b and 20c. A three-phase AC power waveform is generated from the DC power source voltage so split in two by three-phase inverter circuits 20b and 20c. Accordingly, faster driving rotation can be achieved by the motor 5, in comparison to conditions where the applied voltage is that of the DC power source split into three parts.

Furthermore, when turn count NO exceeds predetermined turn count N2 (N in S5), the control circuit 4 performs control such that interrupter circuits 30a and 30b are switched to the interruption mode while interrupter circuit 30c remains in the conduction mode (S8). Specifically, interrupter circuits 30a and 30b are controlled in accordance with the timing chart given by FIG. 6, while the other interrupter circuit 30c is controlled in accordance with the timing chart given by FIG. 5. The control circuit 4 performs further control such that three-phase inverter circuits 20a and 20b are switched to the short-circuit mode while the other three-phase inverter circuit 20c remains in the operation mode (S9). Specifically, three-phase inverter circuits 20a and 20b are controlled in accordance with the timing chart given by FIG. 6, while the other three-phase inverter circuit 20c is controlled in accordance with the timing chart given by FIG. 5. As shown in FIG. 8B, the controls performed in steps S8 and S9 cause the DC voltage supplied by the DC power source 1 to be applied to three-phase inverter circuits 20c via three-phase inverter circuits 20a and 20b, which are in the short-circuit mode. That is, the DC voltage supplied by the DC power source 1 goes from being split into two parts by the three-phase inverter circuits 20b and 20c, to not being split at all. A three-phase AC power waveform is generated from the DC power source voltage thus unsplit by three-phase inverter circuits 20c. Accordingly, faster driving rotation can be achieved by the motor 5, in comparison to conditions where the applied voltage is that of the DC power source split into two parts.

By executing the above-described control, necessary and sufficient DC voltage is applicable to the three-phase inverter circuits in accordance with the turn count of the motor 5. Thus, great reductions in dependence on DC voltage magnitude and in switching errors occurring during switching operations are made possible. Also, such a motor drive apparatus is able to reduce the voltage applied to the switching elements making up a three-phase inverter circuit in a region that is used frequently for a relatively low turn count. Thus, improvements are achieved for the useful life of the switching element and the reliability of the motor drive apparatus. Further, the three-phase inverter circuits 20a, 20b, and 20c are respectively configured to connect to the coils 50a, 50b, and 50c via the interrupter circuits 30a, 30b, and 30c. As such, when an abnormality is detected in any the three-phase inverter circuits 20a, 20b, and 20c and the coils 50a, 50b, and 50c, the path that is in the abnormal state (i.e., between the three-phase inverter circuit and the coil) is easily severable using the interrupter circuit. Accordingly, the motor drive mode is maintainable despite the occurrence of abnormalities, such as insulation failure, in turn preventing unexpected conditions from arising.

Here, turn count N1' is a turn count that is slightly lower than turn count N1. Turn count N1' is set such that, when the turn count of the motor 5 exceeds turn count N1', then the AC voltage produced by the three-phase inverter circuits 20a, 20b, and 20c splitting the DC power source voltage into three parts is no longer able to drive the motor 5, due to the effect of back-voltage produced in the motor 5. Also, turn count N2' is a turn count that is slightly lower than turn count N2. N2' is a turn count set such that, when the turn count of the motor 5 exceeds N2', then the AC voltage produced by the three-phase inverter circuits 20b and 20c splitting the DC power source voltage into two parts is no longer able to drive the motor 5, due to the effect of back-voltage produced in the motor 5. The specific values of turn counts N1, N1', N2, and N2' vary according to the specifications of the motor used.

2. Embodiment 2

In the present Embodiment, the temperature of the power converter is detected in order to avoid abnormal states and damage caused by excessively high power converter temperatures, thus enabling improvements in the useful life of the power converter and enhancing the overall reliability of the motor drive apparatus.

Figure 10:
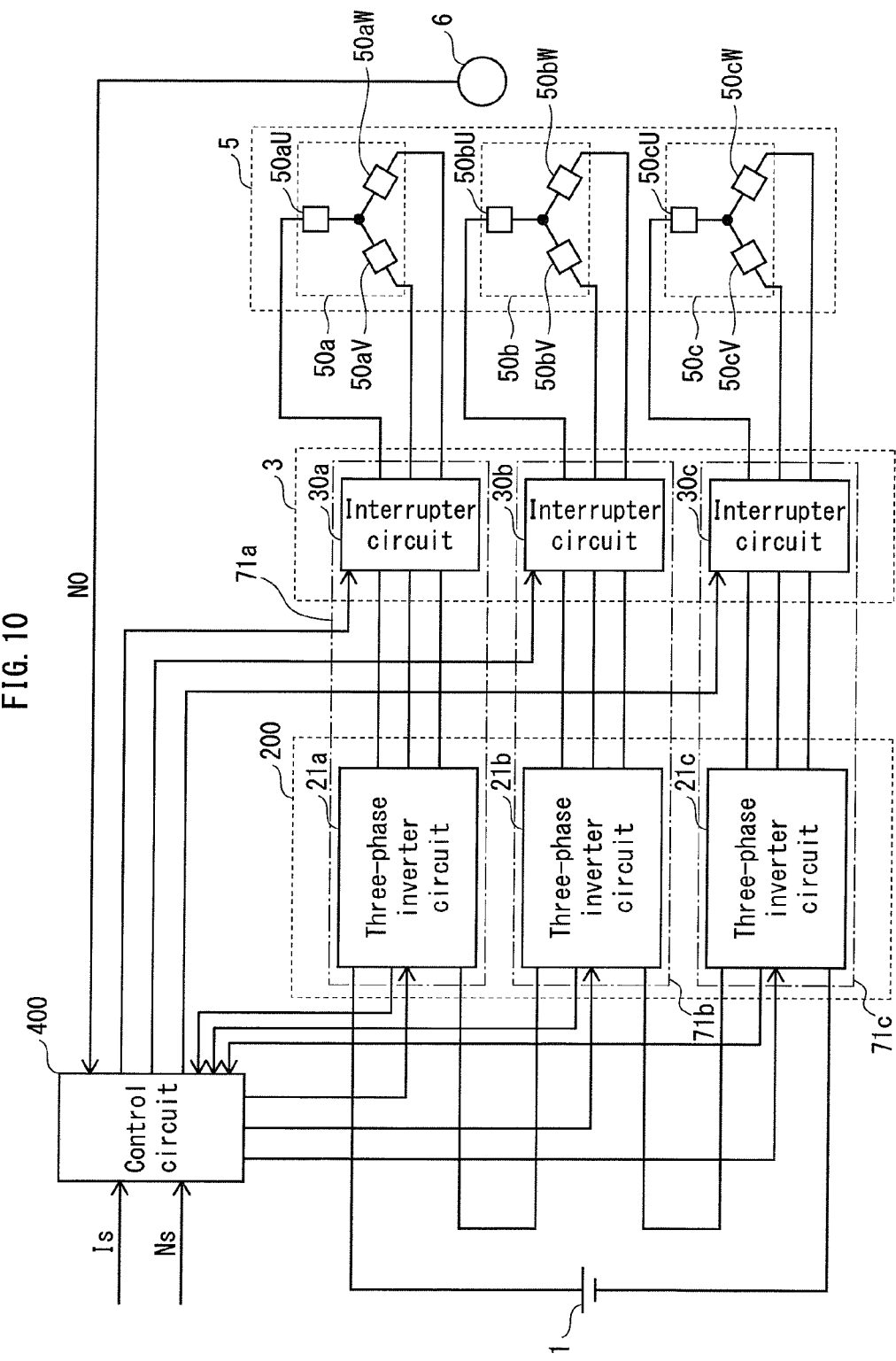
FIG. 10 illustrates the overall configuration of a motor drive apparatus pertaining to Embodiment 2.

FIG. 10 illustrates the overall configuration of a motor drive apparatus pertaining to Embodiment 2.

In the motor drive apparatus illustrated in FIG. 10, the inverter circuit group 2, the power converters 70a through 70c, and the control circuit 4 of the motor drive apparatus from FIG. 1 are respectively replaced by inverter circuit group 200, power converters 71a through 71c, and control circuit 400.

The inverter circuit group 200 includes the three-phase inverter circuits 21a, 21b, and 21c.

Figure 11:
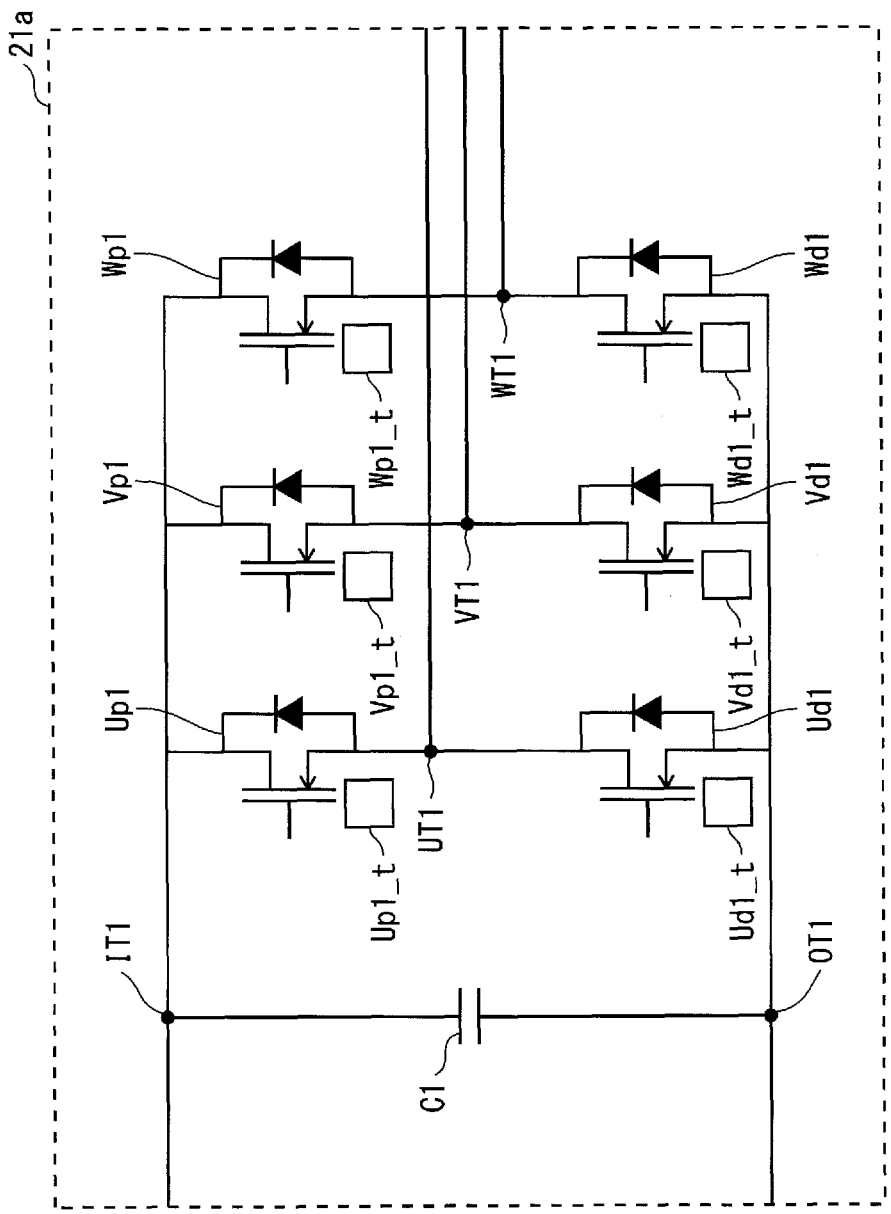
FIG. 11 is a circuit diagram illustrating the details of a three-phase inverter circuit.

FIG. 11 is a circuit diagram illustrating the details of three-phase inverter circuit 21a.

Three-phase inverter circuit 21a is configured similarly to three-phase inverter circuit 20a, with the addition of temperature detectors Up1_t, Ud1_t, Vp1_t, Vd1_t, Wp1_t, and Wd1_t. The other three-phase inverter circuits 21b and 21c are configured identically to three-phase inverter circuit 20a. The following description centers on three-phase inverter circuit 21a and power converter 71a.

Power converter 71a includes three-phase inverter circuit 21a and interrupter circuit 30a, power converter 71b includes three-phase inverter circuit 21b and interrupter circuit 30b, and power converter 71c includes three-phase inverter circuit 21c and interrupter circuit 30c.

The following describes the operations.

Figure 12:
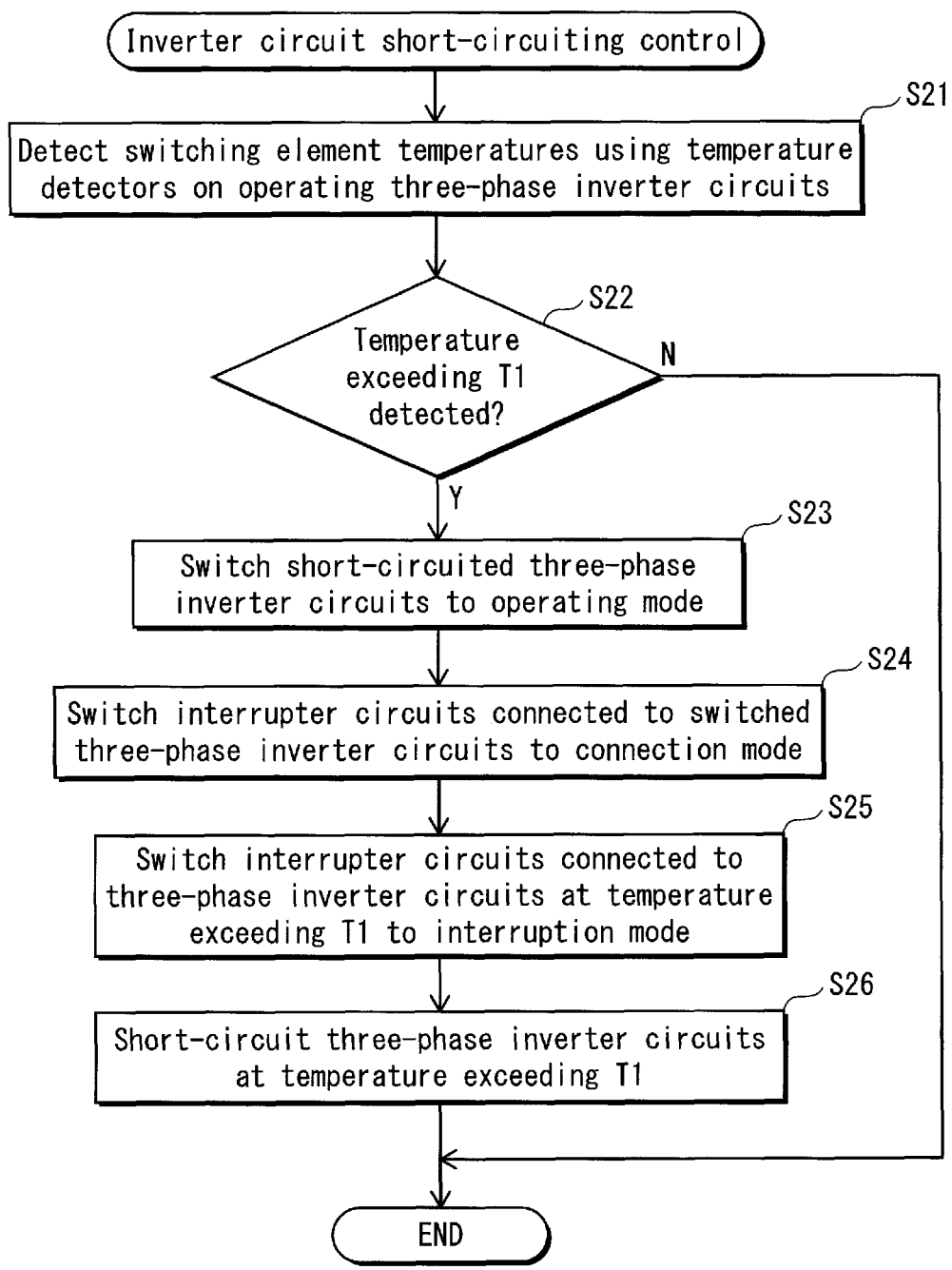
FIG. 12 describes an inverter circuit short-circuiting control process.

FIG. 12 indicates an inverter circuit short-circuiting control process.

First, the temperature of the power converters 71a, 71b, and 71c is detected. More precisely, the temperature detectors Up1_t, Ud1_t, Vp1_t, Vd1_t, Wp1_t, and Wd1_t respectively detect the temperature of the switching elements Up1, Ud1, Vp1, Vd1, Wp1, and Wd1, then provide switching element temperature feedback to the control circuit 400 (S21). When one or more of the power converters is in the short-circuit mode, or more precisely, when the three-phase inverter circuit in one or more of the one power converters is in the short-circuit mode, and a switching element has a switching element temperature that exceeds a predetermined temperature T1 (Y in S22), the control circuit 400 switches the three-phase inverter circuit in the currently short-circuited power converter to the operation mode (S23). The control circuit 400 then switches the interrupter circuit connected to the three-phase inverter circuit in the power converter so switched to a connection mode (S24). The control circuit 400 also switches the interrupter circuit connected to the three-phase inverter circuit of the power converter that includes the switching element having the temperature greater than predetermined temperature T1 to the interruption mode (S25). The control circuit 400 then switches the three-phase inverter circuit of the power converter that includes the switching element having the temperature greater than the predetermined temperature T1 to the short-circuit mode (S26).

According to the above, excessively high temperatures are avoided in the power converter, i.e., in the switching elements, thus enabling improvements in the useful life of the power converter and switching elements and enhancing the reliability of the motor drive apparatus.

When the power converter is controlled such that the process of switching the three-phase inverter circuit to the short-circuit mode and the process of switching the interrupter circuit to the interruption mode are both performed, the process of switching the interrupter circuit to the interruption mode is beneficially performed before the process of switching the three-phase inverter circuit to the short-circuit mode.

3. Embodiment 3

In Embodiment 2, the temperature of the switching element is detected to detect the power converter temperature. However, in the present Embodiment, the temperature of the smoothing capacitor is detected to detect the power converter temperature.

Figure 13:
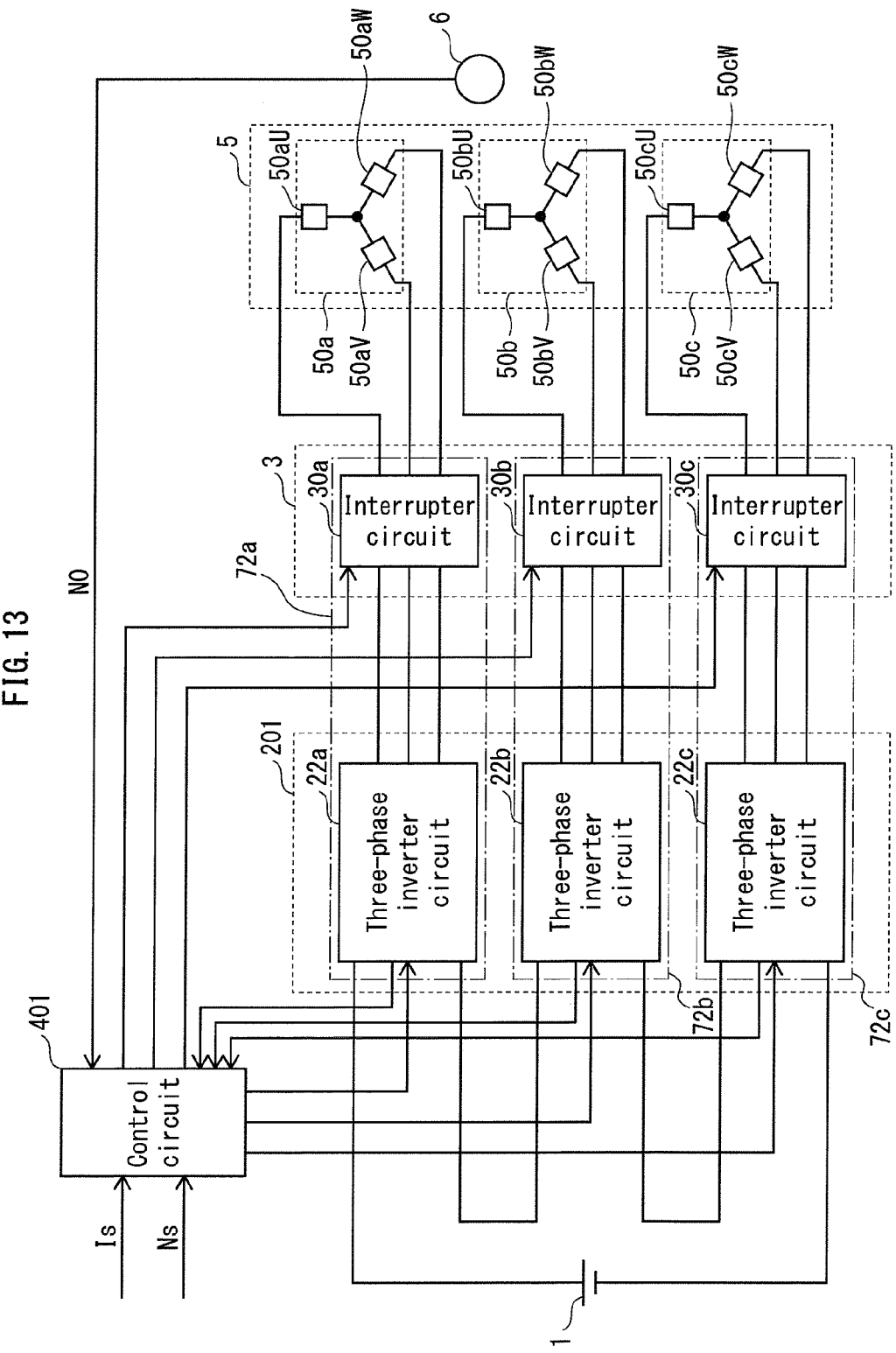
FIG. 13 illustrates the overall configuration of a motor drive apparatus pertaining to Embodiment 3.

FIG. 13 illustrates the overall configuration of a motor drive apparatus pertaining to Embodiment 3.

In the motor drive apparatus illustrated in FIG. 13, the inverter circuit group 2, the power converters 70a through 70c, and the control circuit 4 of the motor drive apparatus from FIG. 1 are respectively replaced by inverter circuit group 201, power converters 72a through 72c, and control circuit 401.

The inverter circuit group 201 includes three-phase inverter circuits 22a, 22b, and 22c. Power converter 72a includes three-phase inverter circuit 22a and interrupter circuit 30a, power converter 72b includes three-phase inverter circuit 22b and interrupter circuit 30b, and power converter 72c includes three-phase inverter circuit 22c and interrupter circuit 30c. The other three-phase inverter circuits 22b and 22c are configured identically to three-phase inverter circuit 22a. As such, the following describes only three-phase inverter circuit 22a and power converter 72a.

Figure 14:
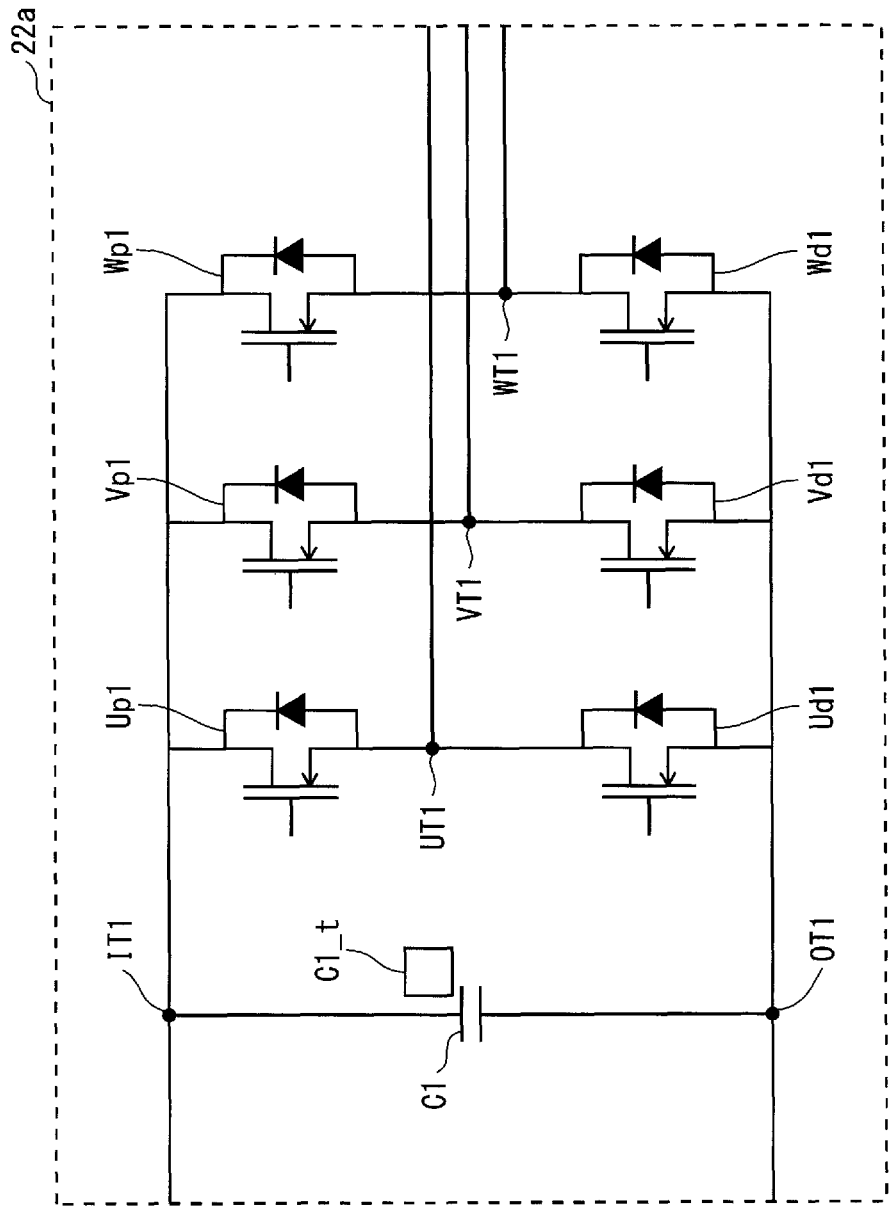
FIG. 14 is a circuit diagram illustrating the details of a three-phase inverter circuit.

FIG. 14 is a circuit diagram illustrating the details of three-phase inverter circuit 22a.

Three-phase inverter circuit 22a differs from three-phase inverter circuit 20a in that the smoothing capacitor C1 has a temperature detector C1_t. The temperature detector C1_t detects the temperature of the smoothing capacitor and provides smoothing capacitor temperature feedback to the control circuit 401. When the smoothing capacitor temperature is above predetermined temperature T2, the control circuit 401 controls the three-phase inverter circuit of the power converter in the short-circuit mode so as to become a three-phase inverter circuit for another one of the power converters. This is similar to the control indicated by FIG. 12, differing only in that the measurements of the switching element temperature in steps S23 through S26 of FIG. 12 are replaced by measurements of the smoothing capacitor temperature.

Generally speaking, the smoothing capacitor is more prone to high temperatures when PWM control is being executed, as opposed to situations where the three-phase inverter circuit is in the short-circuit mode. Thus, this configuration enables the avoidance of excessively high temperatures for the power converter, specifically for the smoothing capacitor. Thus, the useful life of the power converter and the smoothing capacitor are improved, and the reliability of the motor drive apparatus is enhanced.

4. Embodiment 4

In Embodiment 2, the temperature of the switching element is detected to detect the power converter temperature, and in Embodiment 3, the temperature of the smoothing capacitor is detected to detect the power converter temperature. However, in the present Embodiment, the temperature of the interrupter circuit is detected to detect the power converter temperature.

Figure 15:
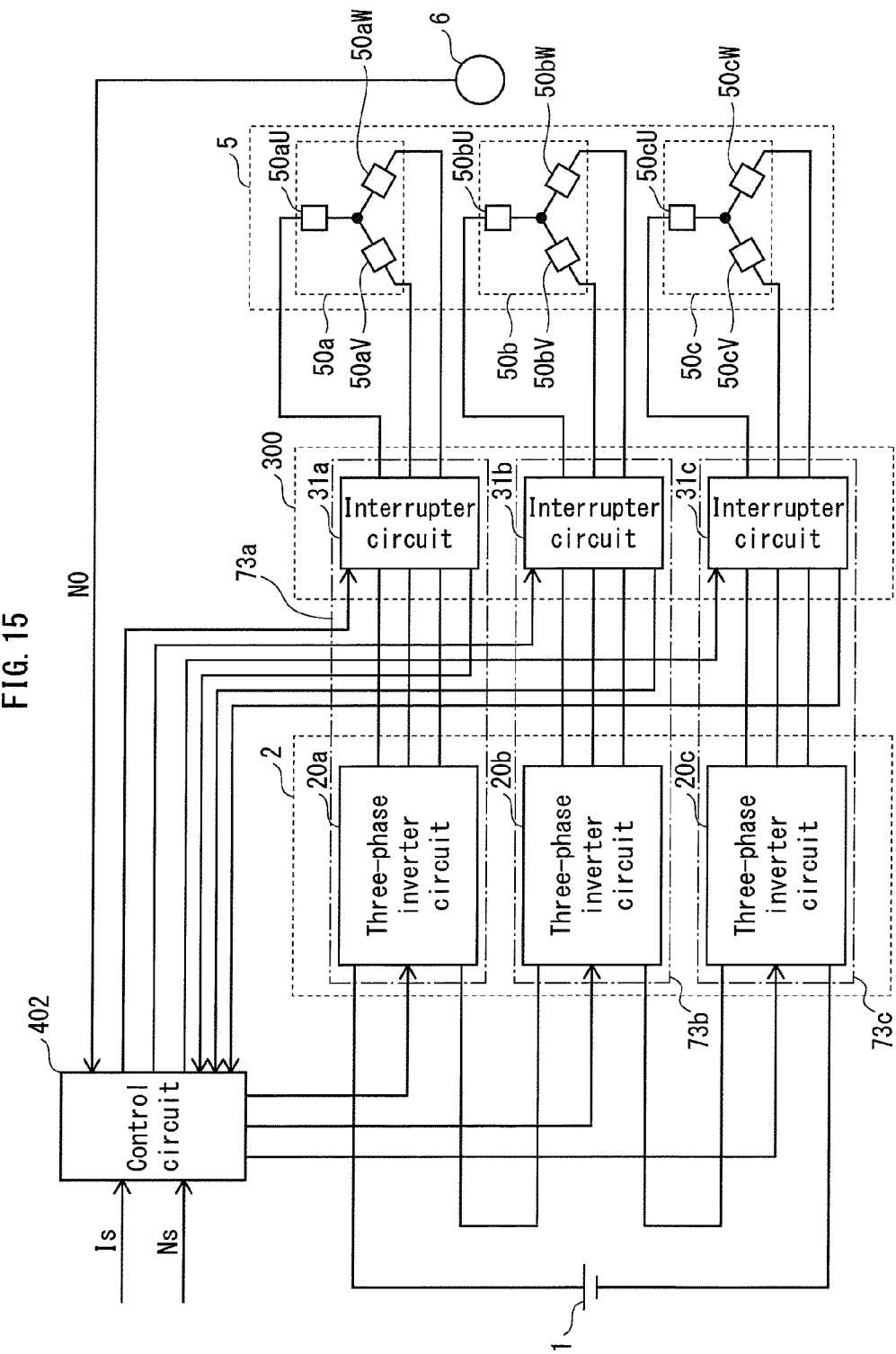
FIG. 15 illustrates the overall configuration of a motor drive apparatus pertaining to Embodiment 4.

FIG. 15 illustrates the overall configuration of a motor drive apparatus pertaining to Embodiment 4.

In the motor drive apparatus illustrated in FIG. 15, the interrupter circuit group 3, the power converters 70a through 70c, and the control circuit 4 of the motor drive apparatus from FIG. 1 are respectively replaced by interrupter circuit group 300, power converters 73a through 73c, and control circuit 402.

The interrupter circuit group 300 includes interrupter circuits 31a, 31b, and 31c. Power converter 73a includes three-phase inverter circuit 20a and interrupter circuit 31a, power converter 73b includes three-phase inverter circuit 20b and interrupter circuit 31b, and power converter 73c includes three-phase inverter circuit 20c and interrupter circuit 31c. Interrupter circuits 31b and 31c are configured identically to interrupter circuit 31a. The following describes only interrupter circuit 31a and power converter 73a.

Figure 16:
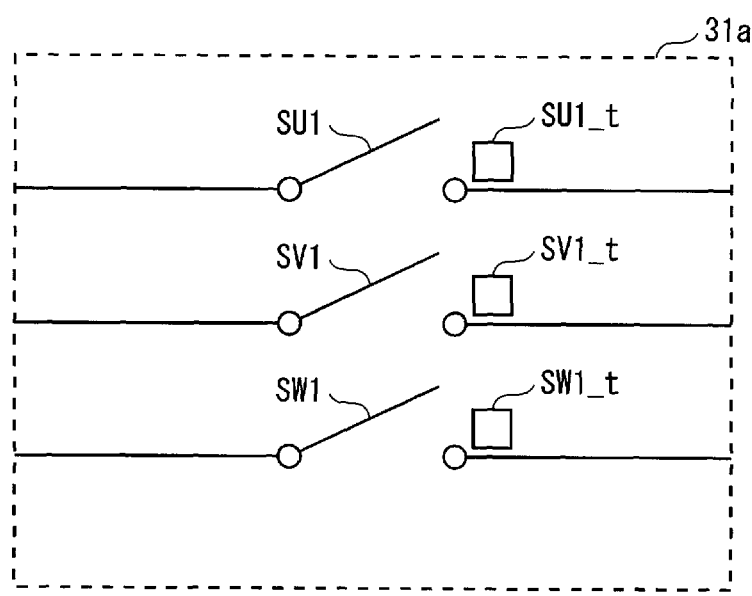
FIG. 16 is a circuit diagram illustrating the configuration of an interrupter circuit.

FIG. 16 is a circuit diagram illustrating the configuration of interrupter circuit 31a.

Interrupter circuit 31a differs from interrupter circuit 30a in the inclusion of temperature detectors SU1_t, SV1_t, and SW1_t. The temperature detectors SU1_t, SV1_t, and SW1_t respectively detect the temperatures of the switches SU1, SV1, and SW1, and provide switch temperature feedback to the control circuit 402. When the switch temperature is greater than predetermined temperature T3, the control circuit 402 performs control so as to switch any currently short-circuited three-phase inverter circuits.

Figure 17:
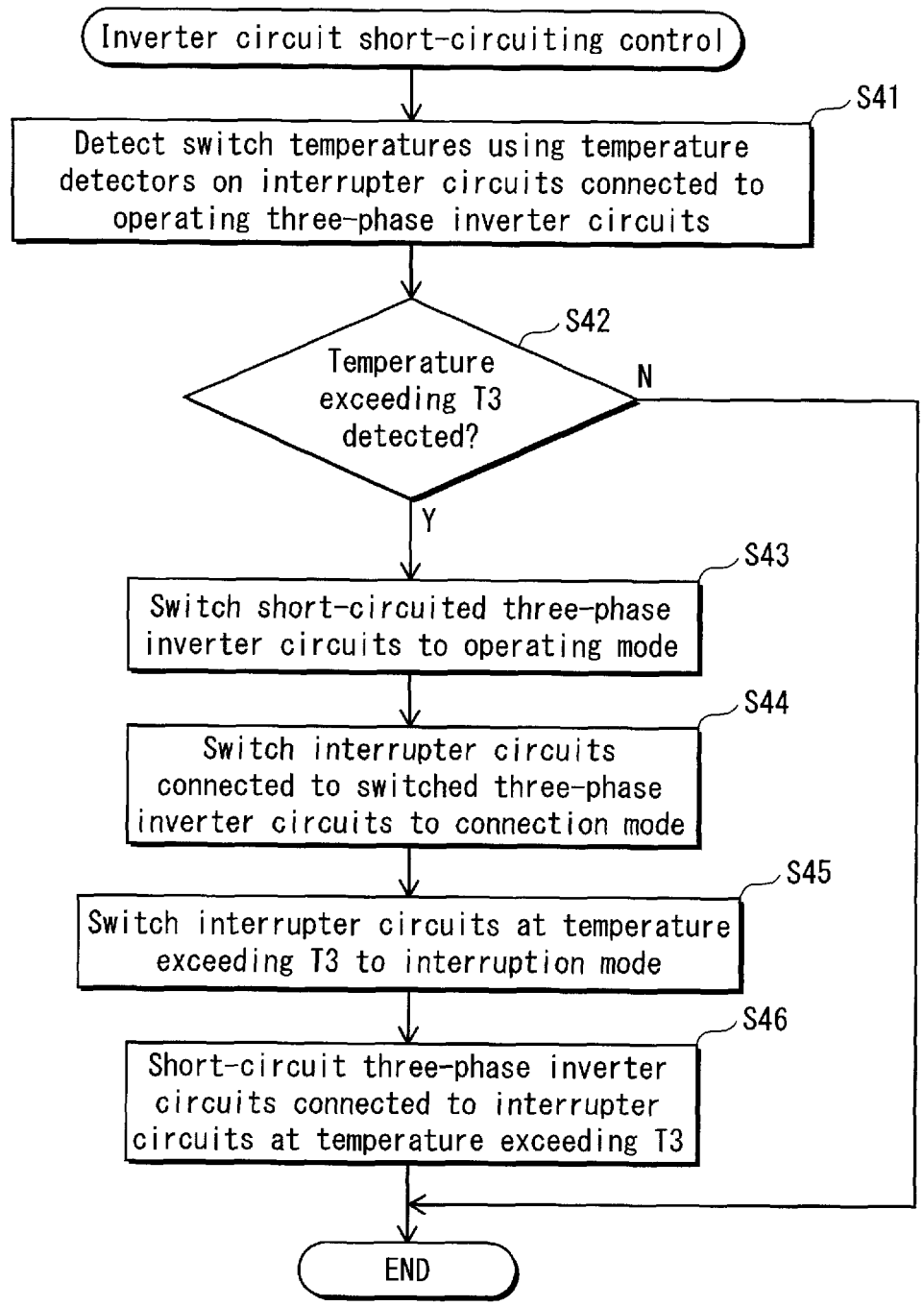
FIG. 17 is a flowchart indicating an inverter circuit short-circuiting control process based on switch temperature.

FIG. 17 is a flowchart indicating an inverter circuit short-circuiting control process based on switch temperature.

First, the temperature of each switch is detected by a temperature detector provided on the interrupter circuit connected to the three-phase inverter circuit of the currently-operating power converter (S41). The temperature detector is not limited to being provided on the interrupter circuit connected to the three-phase inverter circuit of the currently-operating power converter. Switch temperature detection may also be performed by temperature detectors provided on all of the interrupter circuits.

The control circuit 402 determines whether or not the temperature detector has detected a temperature exceeding T3 (S42). When the three-phase inverter circuit in one or more of the one power converters is in the short-circuit mode, and a switch has a temperature exceeding predetermined temperature T3 (Y in S42), the control circuit 402 switches the three-phase inverter circuit in the currently short-circuited power converter to the operation mode (S43). The control circuit 402 then switches the interrupter circuit connected to the three-phase inverter circuit in the power converter so switched to the connection mode (S44).

The control circuit 402 also switches the interrupter circuit connected to the three-phase inverter circuit of the power converter that includes the switch having the temperature exceeding predetermined temperature T3 to the interruption mode (S45). The control circuit 402 then switches the three-phase inverter circuit in the power converter that includes the switch at the temperature exceeding predetermined temperature T3 to the short-circuit mode (S46).

According to the above, excessively high temperatures are avoided in the power converter, i.e., in the switches, thus enabling improvements to the useful life of the power converter and switches and enhancing the reliability of the motor drive apparatus.

5. Embodiment 5

Figure 18:
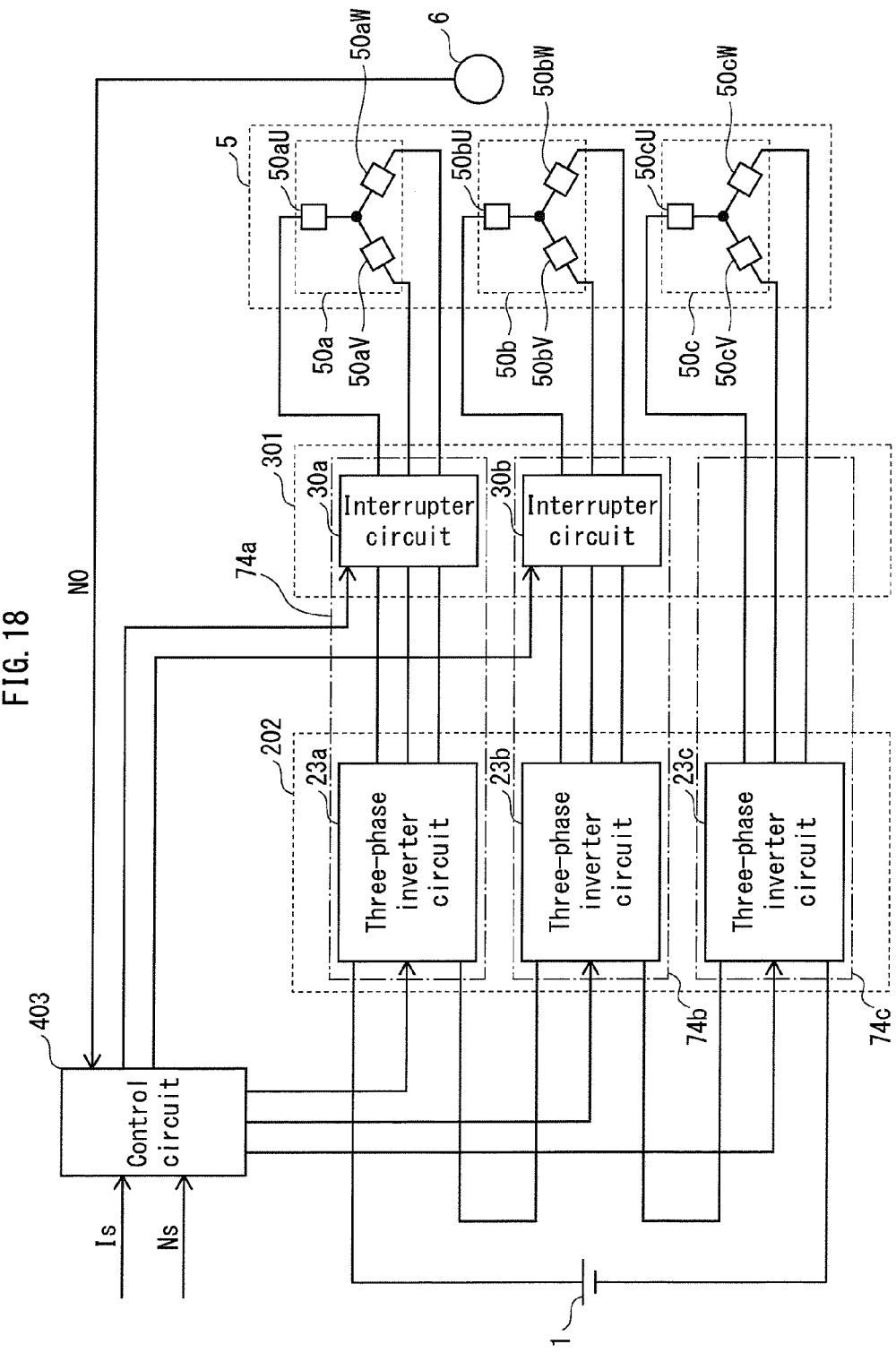
FIG. 18 illustrates the overall configuration of a motor drive apparatus pertaining to Embodiment 5.

FIG. 18 illustrates the overall configuration of a motor drive apparatus pertaining to Embodiment 5.

In the motor drive apparatus illustrated in FIG. 18, the inverter circuit group 2, the interrupter circuit group 4, the power converters 70a through 70c, and the control circuit 4 of the motor drive apparatus from FIG. 1 are respectively replaced by inverter circuit group 202, interrupter circuit group 301, power converters 74a through 74c, and control circuit 403.

The inverter circuit group 202 includes three-phase inverter circuits 23a, 23b, and 23c. The switching elements making up three-phase inverter circuit 23c have greater impedance than the switching elements making up three-phase inverter circuits 23a and 23b. The interrupter circuit group 301 includes interrupter circuits 31a, 31b, and 31c. Power converter 74a includes three-phase inverter circuit 23a and interrupter circuit 30a, power converter 74b includes three-phase inverter circuit 23b and interrupter circuit 30b, and power converter 74c includes three-phase inverter circuit 23c and interrupter circuit 30c. Three-phase inverter circuit 23c is not connected to any interrupter circuit. The switches UT1, VT1, and WT1 of three-phase inverter circuit 23c are each directly connected to one respective end of the coils 50cU, 50cV, and 50cW of coil 50c.

Accordingly, the switching elements making up three-phase inverter circuits 23a and 23b may have comparatively low impedance relative to the switching elements making up three-phase inverter circuit 23c, which is normally and constantly in the operation mode and is more likely to have unsplit voltage supplied thereto. Thus, inverter damage is decreased in comparison to configurations where all elements have high impedance.

Given that three-phase inverter circuit 23c is not connected to any interrupter circuits, interrupter circuit conduction loss is avoided. Consequently, the motor drive apparatus is made more effective and produced at a reduced cost.

Further, steady driving, in which heating from switching loss is constrained, can be achieved despite high turn counts for the motor by having, as in FIG. 18, the current capacity of the switching elements making up three-phase inverter circuit 23c be greater than the current capacity of the switching elements making up three-phase inverter circuits 23a and 23b. Accordingly, improvements are achieved in the efficiency and reliability of the motor drive apparatus.

6. Embodiment 6

Figure 19:
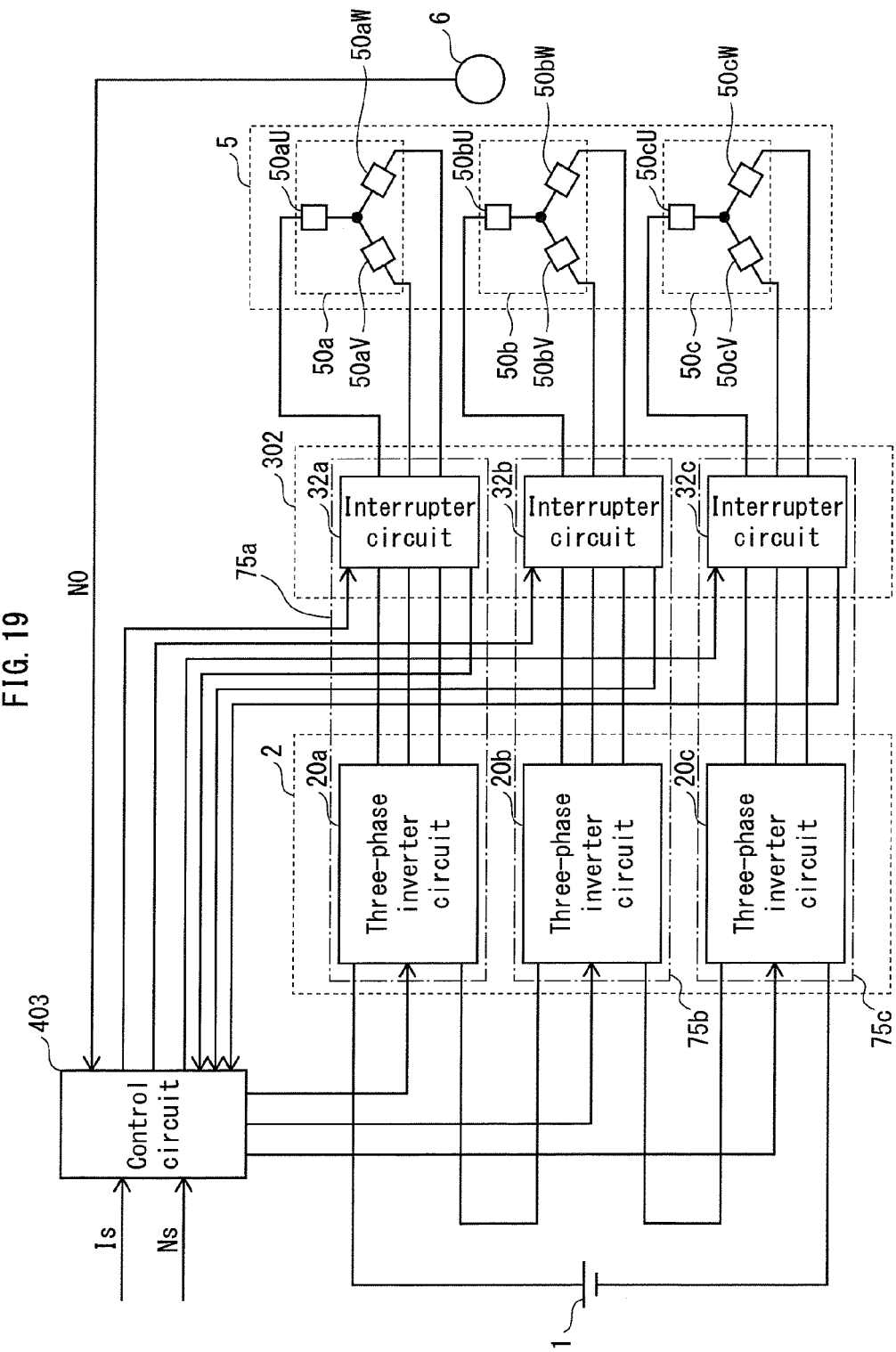
FIG. 19 illustrates the overall configuration of a motor drive apparatus pertaining to Embodiment 6.

FIG. 19 illustrates the overall configuration of a motor drive apparatus pertaining to Embodiment 6.

In the motor drive apparatus illustrated in FIG. 19, the interrupter circuit group 3, the power converters 70a through 70c, and the control circuit 4 of the motor drive apparatus from FIG. 1 are respectively replaced by interrupter circuit group 302, power converters 75a through 75c, and control circuit 404.

Power converter 75a includes three-phase inverter circuit 20a and interrupter circuit 32a, power converter 75b includes three-phase inverter circuit 20b and interrupter circuit 32b, and power converter 75c includes three-phase inverter circuit 20c and interrupter circuit 32c. The interrupter circuit group 302 includes interrupter circuits 32a, 32b, and 32c. Interrupter circuits 32b and 32c are configured identically to interrupter circuit 32a. The following describes only interrupter circuit 32a.

Figure 20:
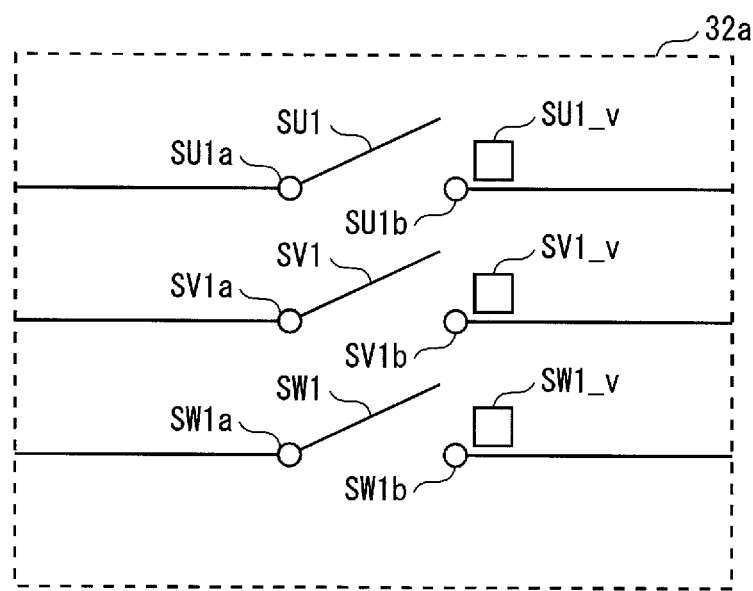
FIG. 20 is a circuit diagram illustrating the configuration of an interrupter circuit.

FIG. 20 is a circuit diagram illustrating the configuration of interrupter circuit 32a.

Interrupter circuit 32a differs from interrupter circuit 30a in the inclusion of voltage detectors SU1_v, SV1_v, and SW1_v. The voltage detectors SU1_v, SV1_v, and SW1_v detect an inter-terminal voltage value for the respective switches SU1, SV1, and SW1, and provide feedback to the control circuit 404.

The control circuit 404 splits the voltage between terminals SU1a and SU1b of switch SU1 by the ON resistance to obtain the value of the current flowing through switch SU1. The control circuit 404 also splits the voltage between terminals SV1a and SV1b of switch SV1 by the ON resistance to obtain the value of the current flowing through switch SV1. Further, the control circuit 404 splits the voltage between terminals SW1a and SW1b of switch SW1 by the ON resistance to obtain the value of the current flowing through switch SW1.

According to this configuration, current values are obtainable without using a current sensor, which is expensive and susceptible to malfunctions during high-temperature operation. Thus, improvements are made to the motor drive apparatus in terms of reliability and cost efficacy.

7. Embodiment 7

Figure 21:
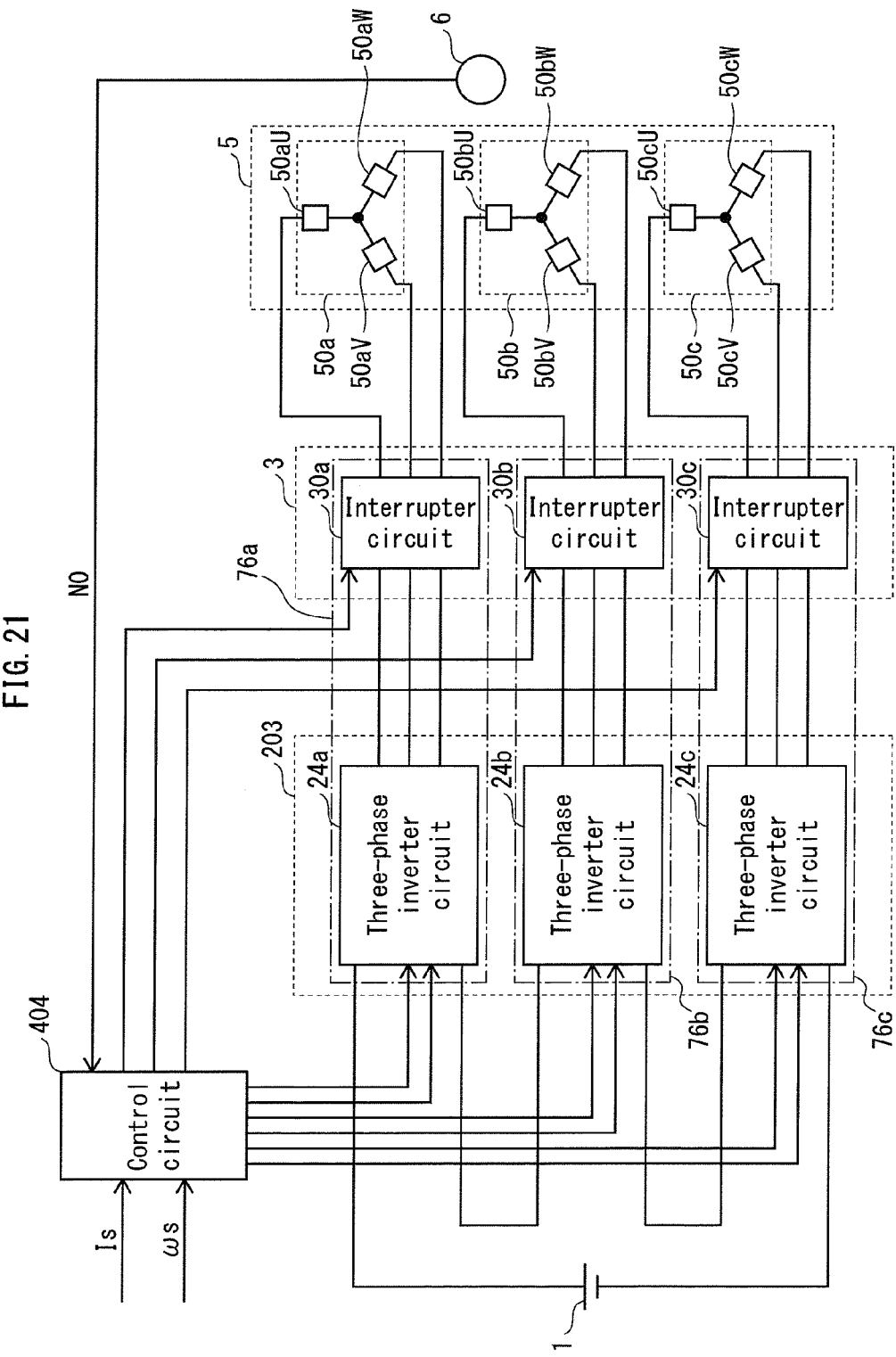
FIG. 21 illustrates the overall configuration of a motor drive apparatus pertaining to Embodiment 7.

FIG. 21 illustrates the overall configuration of a motor drive apparatus pertaining to Embodiment 7.

In the motor drive apparatus illustrated in FIG. 21, the inverter circuit group 2, the power converters 70a through 70c, and the control circuit 4 of the motor drive apparatus from FIG. 1 are respectively replaced by inverter circuit group 203, power converters 76a through 76c, and control circuit 405.

The inverter circuit group 203 includes three-phase inverter circuits 24a, 24b, and 24c. Power converter 76a includes three-phase inverter circuit 24a and interrupter circuit 30a, power converter 76b includes three-phase inverter circuit 24b and interrupter circuit 30b, and power converter 76c includes three-phase inverter circuit 24c and interrupter circuit 30c. Here, three-phase inverter circuits 24b and 24c are configured identically to three-phase inverter circuit 24a. The following describes only three-phase inverter circuit 24a.

Figure 22:
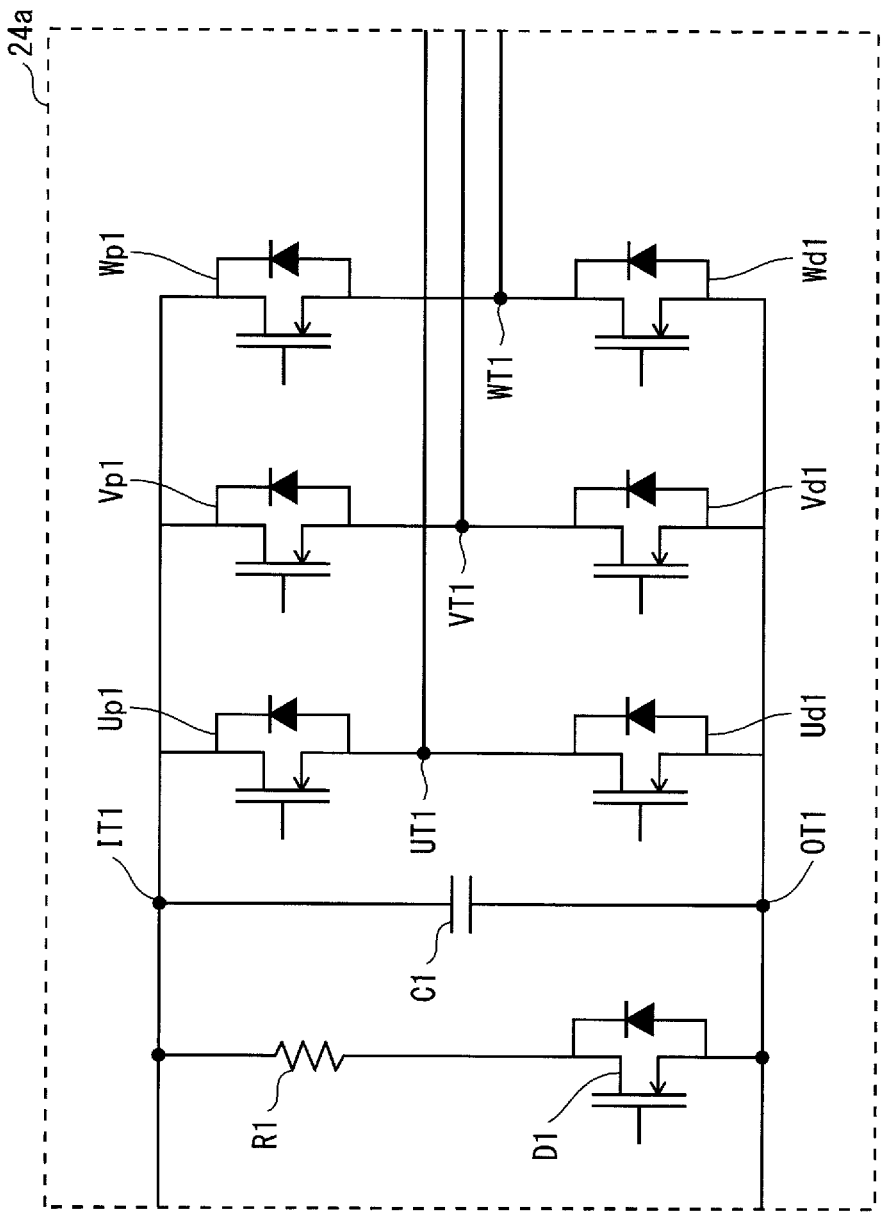
FIG. 22 is a circuit diagram illustrating the details of a three-phase inverter circuit.

FIG. 22 is a circuit diagram illustrating the details of three-phase inverter circuit 24a.

Three-phase inverter circuit 24a differs from three-phase inverter circuit 20a in including a discharging resistor R1 and a discharge switching element D1.

FIG. 23 is a timing chart pertaining to the execution of short-circuiting for the three-phase inverter circuits.

The control circuit 405 detects a turn count for the motor 5 using the position detector 6, and determines whether or not this turn count is greater than a predetermined turn count. When the turn count for the motor is greater than the predetermined turn count, a short-circuit instruction signal (i.e., an internal control circuit signal, not diagrammed) is output, switching at least one of the three-phase inverter circuits to the short-circuit mode. In response to the short-circuit instruction signal, the control circuit 405 outputs a discharge signal DS1 to three-phase inverter circuit 24a as indicated in FIG. 23. The discharge switching element D1 receives the discharge signal DS1 and switches to an ON mode for a predetermined interval. The charge on the smoothing capacitor is discharged by switching the discharge switching element to the ON mode. Here, the value of the discharging resistor R1 is set such that the current flowing through the discharge switching element is equal to or less than the maximum current capacity of the discharge switching element. Once the charge on the smoothing capacitor has been sufficiently discharged, the control circuit 405 switches the discharge switching element to the OFF state and nearly simultaneously switches switching elements Up1 and Ud1 to the ON state.

By performing such control, situations where excessive current flows from the smoothing capacitor are avoided while the three-phase inverter circuit is in the short-circuit mode. Thus, improvements are made to the motor drive apparatus in terms of reliability.

8. Other Variations

Although the present disclosure has described the above Embodiments, the invention is not limited to the above-described Embodiments. Several variations thereon are also possible, provided that the scope of the disclosure is not exceeded.

Figure 7A:
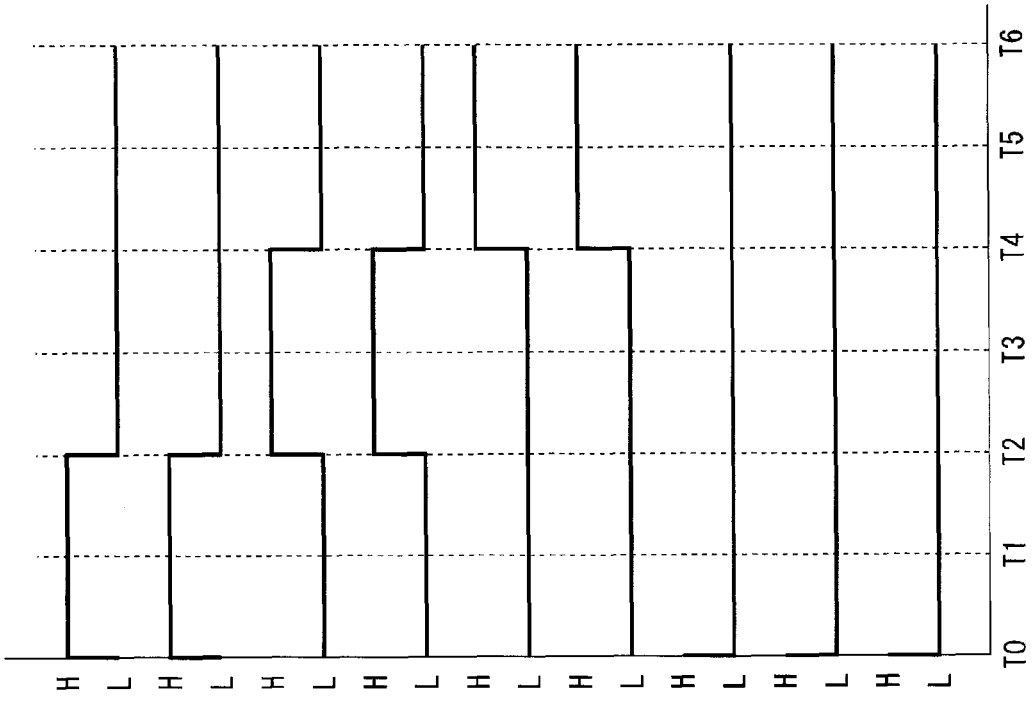
FIG. 7A is a timing chart pertaining to a control signal used to switch the three-phase inverter circuit to a short-circuit mode.

(1) In Embodiment 1, the short-circuit mode of the three-phase inverter circuits is described as being a short-circuit mode for all three phases. However, the short-circuit mode may also be for one phase only. FIG. 7A is a timing chart for a situation where only the U-phase of three-phase inverter circuit 20a is in the short-circuit mode, and accordingly, only switch SU1, which pertains to the U-phase, is in the interruption mode. However, when the three-phase inverter circuits 20a, 20b, and 20c are switched to the short-circuit mode, two or more of the circuits are preferably short-circuited, and ideally, all three circuits are short-circuited. This is done to reduce the value of the ON resistance conducted while in the short-circuit mode, thus enabling a decrease in loss.

Figure 7B:
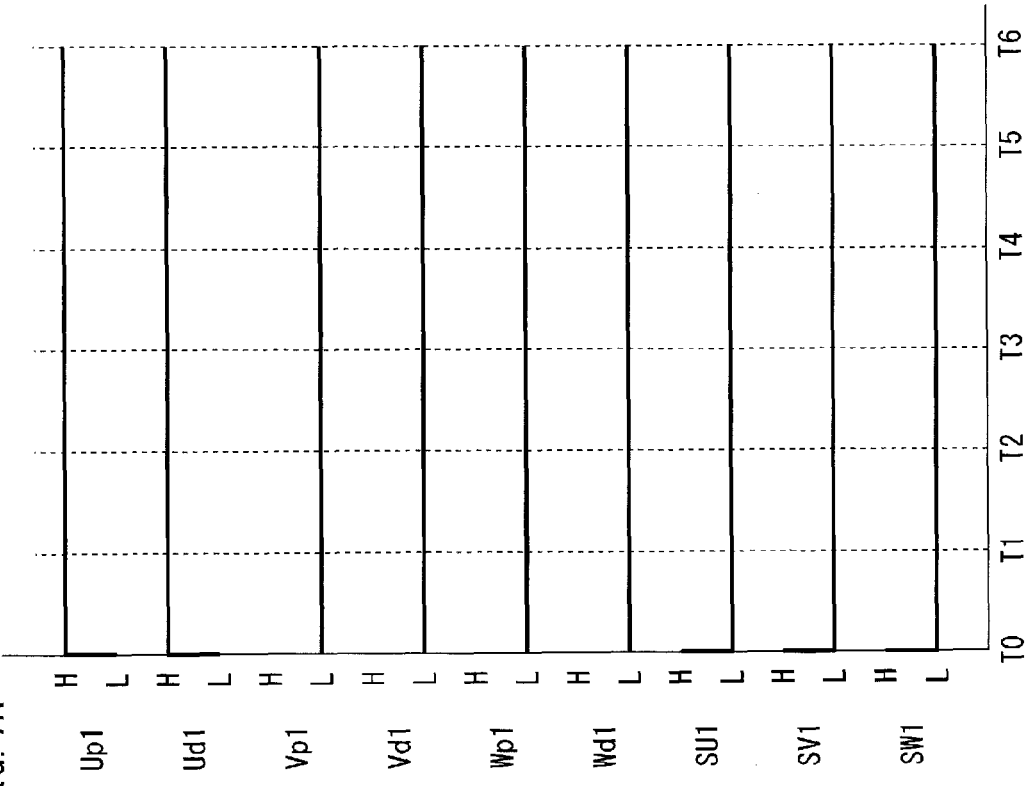
FIG. 7B is a timing chart for a situation where the short-circuit mode switches between U-phase, V-phase, and W-phase at a predetermined interval.

(2) In Variation (1), above, an example is given where the U-phase is short-circuited when three-phase inverter circuit 20a is switched to the short-circuit mode. However, no limitation is intended. The phase being short-circuited may also be changed at predetermined intervals. FIG. 7B is a timing chart for a situation where the phase being short-circuited is switched between the U-phase, the V-phase, and the W-phase. Such an approach dramatically reduces the duration of the short-circuit mode for each switching element, thereby leading to improvements in the useful life of the switching element and further enhancing the reliability of the motor drive apparatus.

Also, when a configuration such as that of Embodiment 2 is used, where the temperatures of circuits pertaining to two or more phases are detected in the three-phase inverter circuits, then when three-phase inverter circuit 20a is switched to the short-circuit mode, one or more circuit detected as having a temperature below a predetermined temperature may be short-circuited, without short-circuiting the circuits detected as having a temperature that exceeds the predetermined temperature. Accordingly, short-circuits caused by abnormal conditions on a given path are avoided, and short-circuiting is reliably made to occur on normally-operating paths.

Further, when at least one of the three-phase inverter circuits is in the short-circuit mode, the short-circuited inverter circuit may be changed at a predetermined interval, such that another one of the inverter circuits is changed to the short-circuit mode. Such an approach leads to improvements in the useful life of the switching elements and further enhances the reliability of the motor drive apparatus.

(3) Switching elements having different characteristics may be used to make up the three-phase inverter circuits 20a, 20b, and 20c. For example, a configuration where the three-phase inverter circuits 20a, 20b, and 20c are so ordered in terms of decreasing ON resistance is beneficial. When the motor 5 is driven to rotate at high speed, such an approach enables a decrease in conduction loss for the switching elements making up the three-phase inverter circuit, thereby providing a high-efficiency motor drive apparatus.

(4) The following may be used for the interrupter circuits 30a, 30b, and 30c.

Figure 9A:
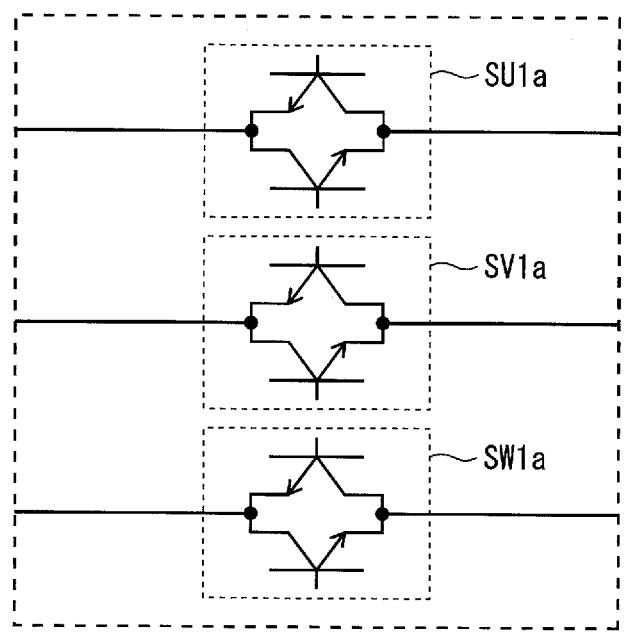
FIGS. 9A and 9B are circuit diagrams respectively illustrating configurations of interrupter circuits pertaining to a Variation.
Figure 9B:
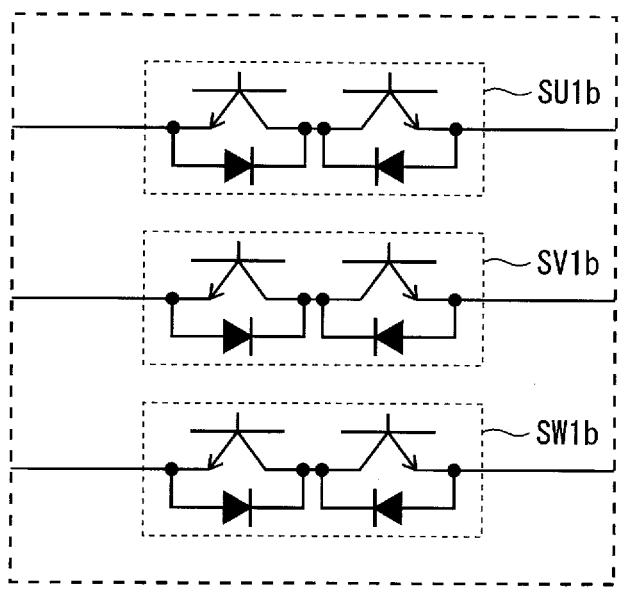

FIGS. 9A and 9B are circuit diagrams respectively illustrating configurations of interrupter circuits pertaining to the present Variation.

The interrupter circuit shown in FIG. 9A includes interrupter switch elements SU1a, SV1a, and SW1a. The interrupter circuit shown in FIG. 9B includes interrupter switch elements SU1b, SV1b, and SW1b.

All of the interrupter switch elements SU1a, SV1a, SW1a, SU1b, SV1b, and SW1b are semiconductor switch elements. Also, interrupter switch elements SU1a, SV1a, and SW1a are connected in anti-parallel. In contrast, interrupter switch elements SU1b, SV1b, and SW1b are connected in series and in the opposite conduction direction. Such a configuration enables greater cost savings and miniaturization in contrast to other interrupter switch element configurations, such as a relay. Furthermore, this configuration provides a faster response in comparison with relays and the like, and thus enables the smoothing of switching operations performed by the motor drive apparatus. In addition, given that the three-phase inverter circuits and the coils are quickly interruptible when an abnormality occurs in the motor drive apparatus, the reliability of the motor drive apparatus is improved. The semiconductor switches making up the interrupter switches may be MOSFET or similar unipolar transistors, IGBT or similar bipolar transistors, or the like.

(5) In the above-described Embodiments, the number of three-phase inverter circuits switched to the short-circuit mode varies according to the turn count of the motor. However, the number of three-phase inverter circuits switched to the short-circuit mode may vary not only according to the turn count but also according to other operating conditions of the motor.

A. For example, the number of three-phase inverter circuits switched to the short-circuit mode may vary according to motor torque (i.e., motor current).

When greater torque (motor current) is required, the DC current from the battery is increased. As a result, the battery is prone to heating. To avoid this result, when greater torque is needed, all three of the three-phase inverter circuits are switched to the operation mode such that the power supply voltage is split into three parts. As such, all three of the three-phase inverter circuits are connected in series, enabling greater torque to be produced with a lower current than can be achieved when only one of the three-phase inverter circuits drives the motor.

B. As another example, the number of three-phase inverter circuits switched to the operation mode may vary according to the phase of current in the motor.

For instance, in a configuration that makes use of reluctance torque in the motor, the phase of the current in the motor may be controlled. Specifically, the angle of the current phase is advanced. However, advance the angle in this way leads to the generation of a magnetic field opposing that of the permanent magnets arranged in the rotor component of the motor. Excessive use of such control is potential risk for demagnetization. In such cases, the effect of the opposing magnetic field on the permanent magnets is such that the back-voltage produced between terminals (where back voltage is proportional to the change in magnetic flux) in the motor is suppressed.

Specifically, when the motor is driven using reluctance torque at a low turn count, and there is a risk of magnetic loss for the magnets (mainly high-temperature demagnetization), the advancement of the current angle is stopped. In such circumstances, the back-voltage, having been constrained before stopping the advancement of the current angle, is no longer so constrained.

Accordingly, the power supply voltage increases as the back-voltage grows, and control is performed such that, for example, two of the three-phase inverter circuits are short-circuited while one of the three-phase inverter circuits generates three-phase AC voltage from the unsplit voltage, and supplies this voltage to the motor.

(6) In Embodiments 2, 3, and 4, the detection of the power converter temperature is described as being performed by detecting the temperature of the switching element, smoothing capacitor, and interrupter circuit, respectively. However, no limitation is intended. The temperature of other components of the power converter may also be detected. For example, the temperature of wiring in the power converters may be measured.

(7) In Embodiments 2, 3, and 4, the temperature of one component (the switching element, the smoothing capacitor, and the interrupter circuit, respectively) is measured by one temperature detector supplied therefor. However, no limitation is intended. Any configuration able to measure the temperature of the power converter may be used. For example, one temperature detector may be provided to perform a plurality of temperature detections. For example, when the switching element and the smoothing capacitor are arranged in close proximity, one temperature detector may be arranged at a midpoint therebetween to perform temperature detection. Also, a temperature detector may be arranged between one power converter and another power converter, and detect the temperature at that position. That is, the quantity and arrangement of the temperature detectors may vary according to the number and arrangement of components subject to temperature detection.

(8) The above-described Embodiments and Variations may be freely combined.

INDUSTRIAL APPLICABILITY

The motor drive apparatus of the present disclosure provides higher efficiency and higher voltage with a simple configuration. As such, the motor drive apparatus is applicable to hybrid electric vehicles and electric vehicles for which demand for miniaturization is strong, to electric compressors, to electric power steering, to motor drive apparatus for inclusion in elevators, and to various electricity generation systems, such as wind energy generation systems.

REFERENCE SIGNS LIST

1 DC power source
2 Inverter circuit group
3 Interrupter circuit group
4 Control circuit
5 Motor
6 Position detector
$20a$, $20b$, $20c$ Three-phase inverter circuits
$30a$, $30b$, $30c$ Interrupter circuits
$32a$, $32b$, $32c$ Interrupter circuits
$50a$, $50b$, $50c$ Coils
Up1, Ud1 Switching elements
Vp1, Vd1 Switching elements
Wp1, Wd1 Switching elements
C1 Smoothing capacitor
SU1, SV1, SW1 Switches

The invention claimed is:

1. A motor drive apparatus receiving electric power supplied from a DC power source and driving a motor that is provided with a plurality of independent polyphase systems of excitation coils, comprising:
a control circuit and a plurality of power converters each corresponding to one of the systems, wherein
each of the power converters includes an inverter circuit, an interrupter circuit connected between the inverter circuit and an excitation coil of a phase of the system, and a temperature detector,
the inverter circuits are connected in series to the DC power source and, while not in a short-circuit mode, each inverter circuit supplies electric power to the excitation coil of a corresponding phase, and
the control circuit detects an operating state of the motor, and switches the inverter circuits to the short-circuit mode and the interrupter circuits to an interruption mode, the inverter circuits and the interrupter circuits pertaining to a subset of the power converters defined according to the operating state of the motor, such that the control circuit causes a source voltage from the DC power source to be supplied to the inverter circuits that are not in the short-circuit mode, and, when a temperature detected for a given power converter by the temperature detector exceeds a predetermined temperature, the control circuit switches the inverter circuit of the given power converter to the short-circuit mode and switches the interrupter circuit of the given power converter to the interruption mode, and, in another power converter for which the temperature detected by the temperature detector does not exceed the predetermined temperature, switches the inverter circuit to an operation mode and switches the interrupter circuit to a connection mode.

2. The motor drive apparatus of claim 1, wherein
each of the inverter circuits comprises a plurality of switching elements in a bridge connection, and
the temperature detector pertaining to each of the power converters measures a temperature for each of the switching elements.

3. The motor drive apparatus of claim 1, wherein
each of the inverter circuits includes a smoothing capacitor, and
the temperature detector pertaining to each of the power converters measures a temperature for the smoothing capacitor.

4. The motor drive apparatus of claim 1, wherein
each of the interrupter circuits includes a plurality of switching elements, and
the temperature detector pertaining to each of the power converters measures a temperature for each of the switching elements.

5. The motor drive apparatus of claim 1, wherein
each of the inverter circuits is a three-phase inverter circuit,
the excitation coils comprise star-connected coils in three phases,
the temperature detector pertaining to each of the power converters detects a temperature for circuits corresponding to each phase, and
when switching the inverter circuits in the power converters to the short-circuit mode, the control circuit switches the circuits corresponding to at least one phase for which the temperature detected by the temperature detector does not exceed the predetermined temperature.

6. The motor drive apparatus of claim 1, wherein
each of the inverter circuits is a three-phase inverter circuit comprising a plurality of switching elements in a bridge connection,
the excitation coils comprise star-connected coils in three phases, and
when switching one of the three-phase inverter circuits to the short-circuit mode, the control circuit switches series-connected switching elements corresponding to at least one of the three phases to a conducting mode.

7. The motor drive apparatus of claim 1, wherein
a specific inverter circuit among the plurality of inverter circuits is never switched to the short-circuit mode by the control circuit, and
a switching element in one of the inverter circuits other than the specific inverter circuit has a lower impedance than a switching element in the specific inverter circuit.

8. The motor drive apparatus of claim 1, wherein
a specific inverter circuit among the plurality of inverter circuits is never switched to the short-circuit mode by the control circuit, and
a switching element in one among the number of inverter circuits in the short-circuit mode has a smaller maximum current capacity than a switching element in the specific inverter circuit.

9. The motor drive apparatus of claim 1, wherein
each of the interrupter circuits comprises a switching element and a voltage detector measuring an ON voltage of the switching element, and
the control circuit uses the ON voltage to detect a current running through the switching element.

10. The motor drive apparatus of claim 1, wherein
each of the inverter circuits is a three-phase inverter circuit, and comprises a bridge circuit including plurality of switching elements in a bridge connection, a smoothing capacitor, and a discharge circuit including a discharging resistor and a discharge switching element, connected in series,
the bridge circuit, the smoothing capacitor, and the discharge circuit are connected in parallel, and
before switching the switching elements in the bridge connection to the short-circuit mode so as to switch the inverter circuits to the short-circuit mode, the control circuit discharges an accumulated charge on the smoothing capacitor by switching the discharging switching element to an ON state for a predetermined interval.

* * * * *